(12) United States Patent
Sueoka et al.

(10) Patent No.: US 9,027,215 B2
(45) Date of Patent: May 12, 2015

(54) PRODUCTION APPARATUS

(75) Inventors: Hisayuki Sueoka, Tokyo (JP); Susumu Noguchi, Tokyo (JP); Hiroyuki Shiga, Tokyo (JP); Hitoshi Tsugawa, Tokyo (JP)

(73) Assignee: Hirata Corporation, Tokyo (JP)

( * ) Notice: Subject to any disclaimer, the term of this patent is extended or adjusted under 35 U.S.C. 154(b) by 1273 days.

(21) Appl. No.: 12/867,093

(22) PCT Filed: Feb. 20, 2008

(86) PCT No.: PCT/JP2008/052807
§ 371 (c)(1),
(2), (4) Date: Aug. 11, 2010

(87) PCT Pub. No.: WO2009/104250
PCT Pub. Date: Aug. 27, 2009

(65) Prior Publication Data
US 2011/0000063 A1   Jan. 6, 2011

(51) Int. Cl.
*B23P 21/00* (2006.01)
*B23Q 7/02* (2006.01)
(Continued)

(52) U.S. Cl.
CPC .......... *B23P 21/006* (2013.01); *Y10T 29/53404* (2015.01); *Y10T 29/5196* (2015.01);
(Continued)

(58) Field of Classification Search
CPC ............ Y10T 29/5128; Y10T 29/5127; Y10T 29/513; Y10T 29/53404; Y10T 29/53374; B23Q 39/044; B23Q 39/046; B23P 21/006
USPC ........... 29/38 R, 38 A, 38 B, 38 C, 33 P, 563, 29/564.1, 429, 430, 525, 792, 785; 74/608, 609
See application file for complete search history.

(56) References Cited

U.S. PATENT DOCUMENTS 3,088,198 A * 5/1963 Svenson .......................... 29/705
3,153,276 A * 10/1964 Herbkersman ............... 29/38 C
(Continued)

FOREIGN PATENT DOCUMENTS

JP    2-107441    8/1990
JP    7-11232     2/1995
(Continued)

OTHER PUBLICATIONS

Machine Translation of JP 2007-168038-A, which JP '038 was published Jul. 2007.*
(Continued)

*Primary Examiner* — Erica E Cadugan
(74) *Attorney, Agent, or Firm* — Wenderoth, Lind & Ponack, L.L.P.

(57) ABSTRACT

A production apparatus for producing a component assembly by sequentially performing predetermined processes in a plurality of processing areas (A1 to A6) arranged in a ring formation and then, by separating a jig. The apparatus includes a rotational table main body (20), a plurality of holding/transfer units (30) rotatable integrally with the rotational table main body and capable of holding an object and transferring the same onto processing tables in the plurality of processing areas, a plurality of loading portions (40) provided on the rotational table main body corresponding to the plurality of holding/transfer units and capable of loading the jig, and a plurality of processing units (60 to 110) provided for performing predetermined processes in the plurality of processing areas.

12 Claims, 16 Drawing Sheets

(51) Int. Cl.
  *B23Q 39/04* (2006.01)
  *B23P 19/02* (2006.01)
  *B23P 15/14* (2006.01)

(52) U.S. Cl.
  CPC ......... *Y10T29/49945* (2015.01); *B23Q 39/046* (2013.01); *B23P 15/14* (2013.01); *Y10T 74/2191* (2015.01); *B23P 19/02* (2013.01); *Y10T 29/513* (2015.01); *Y10T 29/5137* (2015.01); *Y10T 29/49829* (2015.01); *B23Q 7/02* (2013.01); *B23Q 39/044* (2013.01)

(56) References Cited

U.S. PATENT DOCUMENTS

| | | | | |
|---|---|---|---|---|
| 3,798,736 | A * | 3/1974 | Gibbons et al. | 29/38 R |
| 3,938,748 | A * | 2/1976 | Camardella | 242/440 |
| 5,038,463 | A * | 8/1991 | Kamata et al. | 29/779 |
| 5,083,357 | A * | 1/1992 | Noguchi et al. | 29/430 |
| 5,406,696 | A * | 4/1995 | Walsh | 29/705 |
| 5,519,932 | A * | 5/1996 | Kuze | 29/564.1 |
| 5,815,902 | A * | 10/1998 | Osterried et al. | 29/38 A |
| 5,983,902 | A * | 11/1999 | Heneghan et al. | 132/200 |
| 6,435,397 | B2 * | 8/2002 | Angel | 228/49.1 |
| 8,430,226 | B2 * | 4/2013 | Tokunaga et al. | 198/346.2 |
| 8,430,227 | B2 * | 4/2013 | Sueoka et al. | 198/346.2 |
| 8,556,245 | B2 * | 10/2013 | Sueoka et al. | 269/56 |
| 2003/0213116 | A1 * | 11/2003 | Smith et al. | 29/429 |
| 2004/0107805 | A1 * | 6/2004 | Baldini et al. | 29/38 A |
| 2005/0060879 | A1 * | 3/2005 | Kumeth | 29/785 |

FOREIGN PATENT DOCUMENTS

| | | |
|---|---|---|
| JP | 11-170129 | 6/1999 |
| JP | 2007-168038 | 7/2007 |

OTHER PUBLICATIONS

International Search Report issued Mar. 18, 2008 in International (PCT) Application No. PCT/JP2008/052807.

* cited by examiner

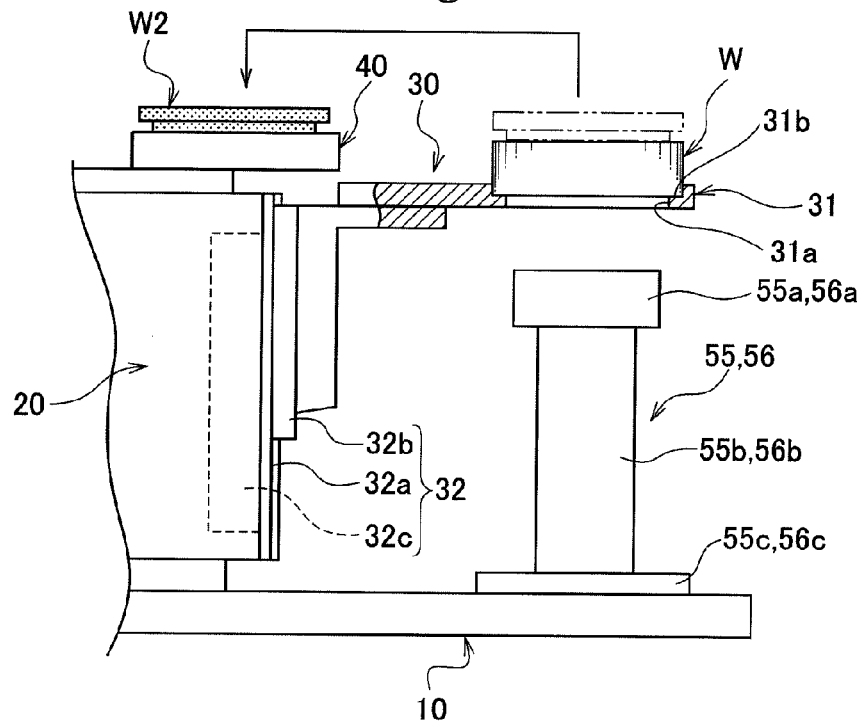
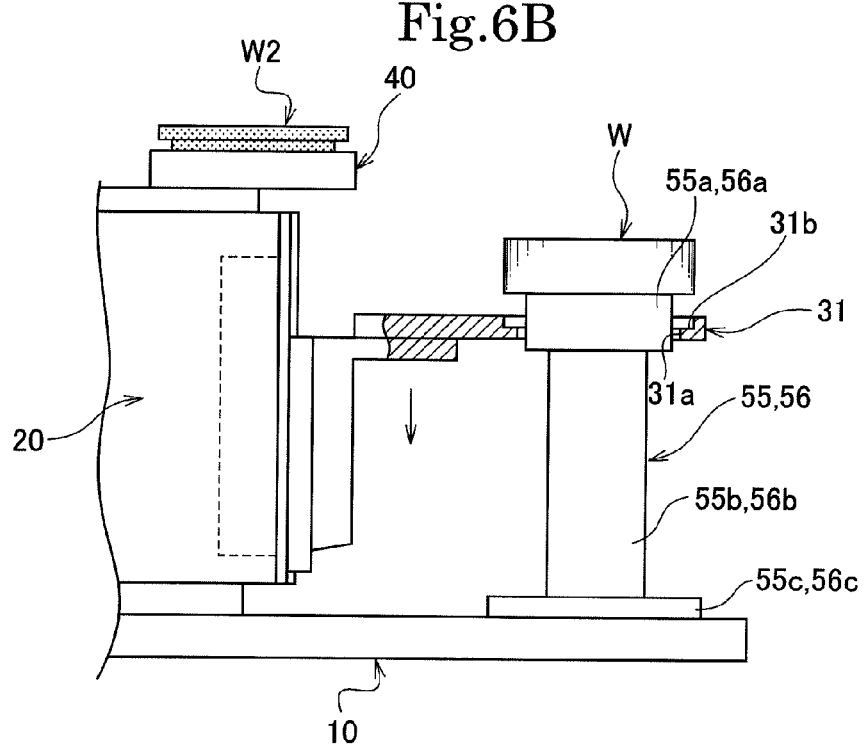

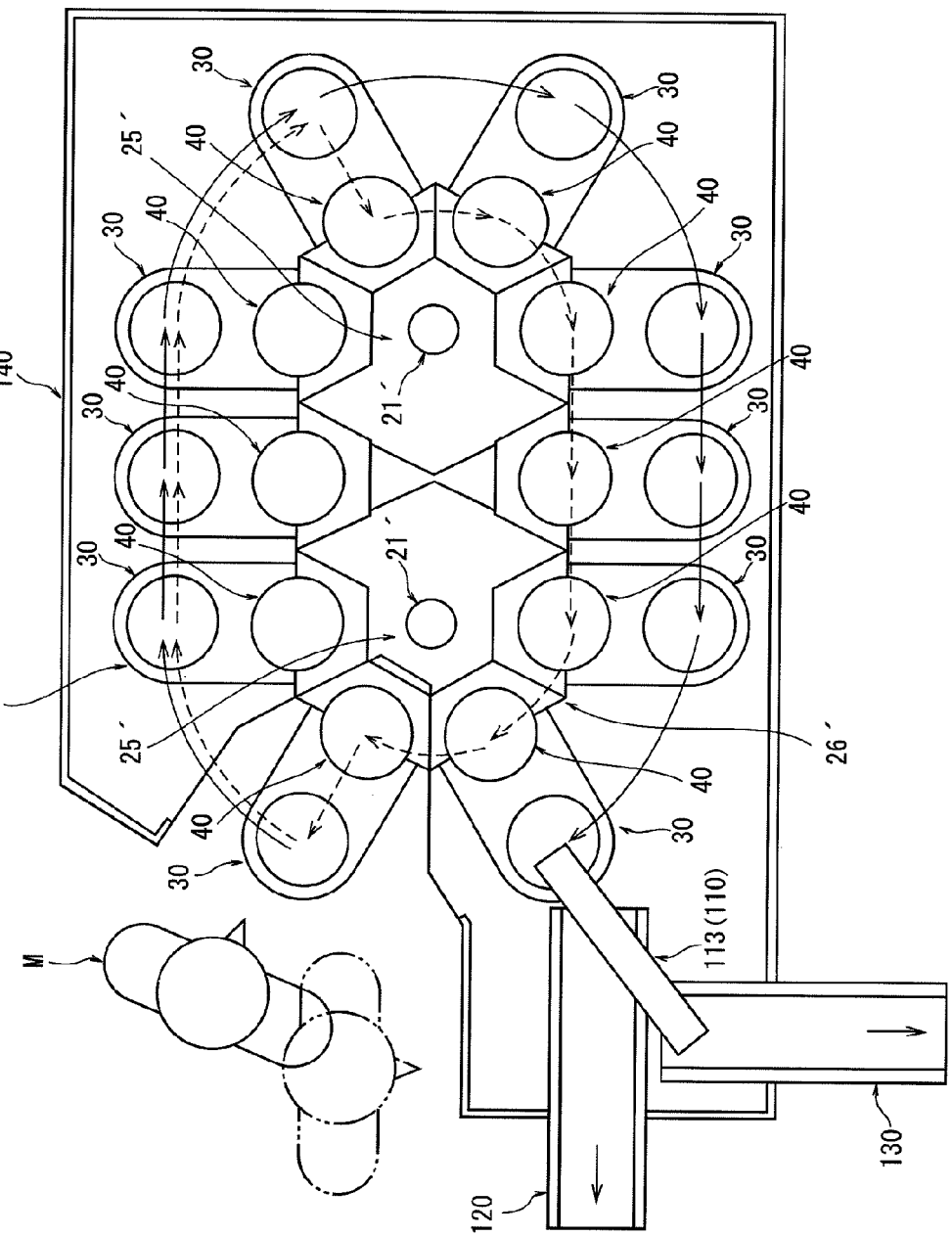

PRODUCTION APPARATUS

BACKGROUND OF THE INVENTION

1. Technical Field

The present invention relates to a production apparatus for producing a mechanical component or an electronic component and the like by performing predetermined processes (pre-inspection, press-fit, transfer, caulking, determination on acceptability, sorting and the like, for example) in a plurality of processing areas arranged around a rotational table, and particularly to a production apparatus for producing a component assembly by assembling a subsidiary component to a main component using a jig.

2. Description of the Related Art

As a conventional production apparatus, an assembling apparatus for a strut assembly that is provided with a plurality of work areas (first stage, second stage, third stage, fourth stage) arranged in a ring formation, a rotational table rotated by steps of a predetermined angle and positioned at a position corresponding to each work area, and a plurality of jigs (work holding fixtures) fixed on the rotational table so as to correspond to the respective work areas. In this apparatus, an operator sets a main component (wheel strut) and a subsidiary component (coil spring) on a jig in the first stage and then, the rotational table is rotated by a predetermined angle to move to the second stage, where predetermined processes (a process to withdraw a rod of the strut and a process to assemble an upper seat on an upper part of the rod) are automatically performed, and then, the rotational table is rotated by a predetermined angle to move to the third stage, where predetermined processes (an assembling process of an insulator, a nut fastening process) are performed, and then, the rotational table is rotated by a predetermined angle to move to the fourth stage, where a predetermined process (a taking-out process from the jig) is performed and therefore, a component assembly is obtained, and the rotational table is rotated by a predetermined angle to return to the first stage.

However, in this apparatus, since the process in each work area is performed on the rotational table, if a process to apply a load (pressurization, press-fit or the like) is performed, the rotational table needs to be formed robust so that the load can be endured, which leads to an increase of a size or a cost.

Patent Document 1: Unexamined Japanese Patent Publication No. 11-170129

SUMMARY OF THE INVENTION

1. Problem to be Solved by the Invention

The present invention was made in view of the circumstances of the above conventional technique and has an object to provide a production apparatus for producing a mechanical component or an electronic component and the like by performing predetermined processes in a plurality of processing areas arranged in a ring formation around a rotational table while the structure is simplified, the size of the apparatus is reduced, a cost is lowered and the like and particularly to provide a production apparatus for producing a component assembly by assembling a subsidiary component to a main component using a jig while a plurality of processes including pre-inspection, press-fit, caulking, acceptance determination, sorting and the like are performed.

2. Means for Solving Problem

The production apparatus of the present invention to achieve the above object is a production apparatus for producing a component assembly by sequentially performing predetermined processes to an object to be processed in which a jig for holding a subsidiary component is set to a main component in a plurality of processing areas arranged in a ring formation and then, separating the jig, and the apparatus includes a rotational table main body that is intermittently rotated, a plurality of holding/transfer units that are disposed in a peripheral direction so as to rotate integrally with the rotational table main body and that are capable of holding the object to be processed or the component assembly and capable of transferring them onto processing tables in the plurality of processing areas, a plurality of loading portions that are provided on the rotational table main body, corresponding to the plurality of holding/transfer units and are capable of loading the jig, and a plurality of processing units disposed in order to perform predetermined processes in the plurality of processing areas.

According to this configuration, when the jig for holding the subsidiary component is set to the main component and the object to be processed is prepared, and the object to be processed is set to the holding/transfer unit in the first processing area, the rotational table main body is intermittently rotated, the object to be processed is transferred from the holding/transfer unit onto the processing table in the plurality of processing areas, and the predetermined process is performed by the processing units. In the middle processing area, when the subsidiary component is assembled to the main component and the component assembly is obtained, the jig which is no longer needed is transferred to the loading portion on the rotational table main body (manually or automatically) and the component assembly is held by the holding/transfer unit and further transferred onto the processing table in the subsequent processing area and subjected to another process, and the jig is loaded on the loading portion and returned to the first processing area with the rotation of the rotational table main body.

As described above, the object to be processed is transported by the holding/transfer unit rotated integrally with the rotational table main body and the predetermined process to the object to be processed is performed after the object to be processed is transferred onto the processing table disposed in the processing area, whereby a load generated by the process does not have to be received by the rotational table main body, hence, size reduction and simplification of the rotational table main body can be achieved. Also, the jig which is no longer needed is transferred to the loading portion and returned to the first processing area with the rotation of the rotational table main body, whereby the subsidiary component can be set to the main component in a state in which the subsidiary component is temporarily assembled using this jig again, and the similar processing can be repeated.

In the above configuration, the plurality of processing units may include a transfer unit for separating the jig from the object to be processed to which the predetermined process has been performed and transferring the jig to the loading portion.

According to this configuration, in a predetermined processing area, since the jig no longer required is automatically separated from the object to be processed to which the predetermined process (press-fit process to press-fit the subsidiary component into the main component, for example) has been finished by the transfer unit, and transferred to the loading portion on the rotational table main body, the jig can be recovered more smoothly, and productivity can be further improved.

In the above configuration, the plurality of holding/transfer units may be formed such that the object to be processed or the component assembly is held at a predetermined raised position and the object to be processed or the component assembly is transferred onto the processing table in the processing area and released at a predetermined lowered position.

According to this configuration, it is only necessary for the holding/transfer unit to perform the elevating operation in order to transfer the object to be processed or the component assembly held (carried) thereby onto the processing table in the processing area and release it or to lift up the object to be processed or the component assembly from the processing table in the processing area and hold (carry) it, whereby the holding/transfer unit can be simplified, and time required for the transfer and holding (carrying) can be reduced.

In the above configuration, the plurality of loading portions may be arranged on the rotational main body at an inside in a radial direction over the holding/transfer unit.

According to this configuration, since the holding/transfer unit and the loading portion are aligned in the radial direction on the rotational table main body, the jig no longer required can be separated from the component assembly on the holding/transfer unit to be transferred to the loading portion easily in a short path.

In the above configuration, the processing table may be formed so as to be movable in a horizontal direction and rotatable around a vertical axis.

According to this configuration, in the processing area, when the predetermined process is to be performed to the object to be processed or the component assembly, the object to be processed or the component assembly can be appropriately positioned with respect to the processing unit by appropriately moving the processing table in the horizontal direction (radial direction of the rotational table main body, for example) or appropriately rotating it around the vertical axis. Therefore, the process can be performed to different types of the object to be processed or the component assembly while a common processing unit is used.

In the above configuration, the plurality of processing units may be formed so as to transfer the jig to the loading portion after performing a predetermined process to the object to be processed and to carry out the component assembly after further performing a predetermined process.

According to this configuration, it is possible to perform the predetermined process to the object to be processed which is temporarily assembled, to transfer the jig which is no longer needed to the loading portion in the middle, to further perform the predetermined process to the remaining component assembly and to carry out the component assembly for which all processes have been performed.

When the component assembly is produced by assembling the subsidiary components to the main components using the jig, by going through the processes by the plurality of processing units sequentially performed with rotation of the rotational table main body, the component assembly can be efficiently produced while the jig which is no longer needed is recovered.

In the above configuration, a configuration can be employed in which the plurality of processing areas include a first processing area, a second processing area, a third processing area, a fourth processing area, a fifth processing area, and a sixth processing area arranged sequentially in a circumference direction of the rotational table main body, in which the first processing area includes a first processing table for setting the object to be processed, the second processing area includes a second processing table for holding the object to be processed having been transferred from the holding/transfer unit and a pre-inspection unit for conducting pre-inspection of the object to be processed held on the second processing table, the third processing area includes a third processing table for holding the object to be processed having been transferred from the holding/transfer unit after the pre-inspection and a press-fit unit for performing a press-fit process to the object to be processed held on the third processing table, the fourth processing area includes a transfer unit for separating the jig from the object to be processed held on the holding/transfer unit after the press-fit process and transferring the jig to the loading portion, the fifth processing area includes a fifth processing table for holding the component assembly having been transferred from the holding/transfer unit after the press-fit process, and a caulking unit for performing a caulking process to the component assembly held on the fifth processing table, the sixth processing area includes a sixth processing table for holding the component assembly having been transferred from the holding/transfer area after the caulking process, a determining unit that performs an acceptance determination process of the component assembly held on the sixth processing table (by directly or newly re-grasping the assembly in the state held on the sixth processing table, for example), and a carrying-out unit for sorting and carrying out the component assembly having been subjected to the determination process, and the second processing table, the third processing table, and the fifth processing table are formed so as to be movable in a horizontal direction and rotatable around a vertical axis.

According to this configuration, after the object to be processed is set on the first processing table in the first processing area, if the rotational table main body is rotated and driven by steps of a predetermined angle, the object to be processed held on the second processing table in the second processing area is subjected to the pre-inspection by the pre-inspection unit, the object to be processed held on the third processing table in the third processing area is subjected to the press-fit process by the press-fit unit, the jig which is no longer needed in the fourth processing area is transferred by the transfer unit to the loading portion, the component assembly held on the fifth processing table in the fifth processing area is subjected to the caulking process by the caulking unit, the component assembly held on the sixth processing table in the sixth processing area is subjected to the determination process by the determining unit and the component assembly having been subjected to the determination process is sorted and carried out by the carrying-out unit.

As mentioned above, since the predetermined processes are performed sequentially from the first processing area to the sixth processing area, the component assembly can be efficiently produced. Also, since the two processes, that is, the determination process and the carrying-out process of the component assembly are performed in the sixth processing area, simplification, integration, and cost reduction of the apparatus can be achieved as compared with an apparatus provided with the respective processing areas, and productivity can be improved.

In the above configuration, the determination unit may be formed such that the predetermined determination process is performed while the component assembly held on the sixth processing table is grasped and lifted up.

According to this configuration, the carrying-out operation can be performed by the carrying-out unit while the determination process is performed, and the time required for the entire determination process and the carrying-out process can be reduced.

In the above configuration, a configuration can be employed, in which the apparatus further includes an accepted product transport line and a rejected product transport line for separating and transporting the component assembly determined by the determining unit as accepted or rejected, and in which the carrying-out unit is formed so as to transfer the component assembly to the accepted product transport line or the rejected product transport line only by linear horizontal movement after holding the component assembly.

According to this configuration, since the accepted product can be carried out onto the accepted product transport line and the rejected product can be carried out onto the rejected product transport line only by the horizontal movement of the carrying-out unit for linearly different distances, the component assembly can be smoothly carried out by a simple control sequence.

In the above configuration, the carrying-out unit may include an arm that can hold and release the component assembly, an elevation driving mechanism for elevating the arm, a guide rail for guiding the arm in the horizontal direction, and a horizontal driving mechanism for moving the arm along the guide rail, and the guide rail may be arranged so as to be opposed to the accepted product transport line and the rejected product transport line from above.

According to this configuration, when the arm holds the component assembly, the elevation driving mechanism raises the arm, and the horizontal driving mechanism moves the arm along the guide rail for a predetermined distance to position the arm onto the accepted product transport line or onto the rejected product transport line, and then, the elevation driving mechanism lowers the arm and releases the component assembly onto the respective transport lines.

As mentioned above, the carrying-out unit can be made a simple structure and the carrying-out operation can be completed while the component assembly is sorted to the accepted product or the rejected product with the simple control sequence.

In the above configuration, a configuration can be employed, in which the apparatus further includes a cover case for covering a plurality of the processing areas excluding the processing area for setting the object to be processed on the holding/transfer unit, and in which the cover case is provided with an opening/closing door for allowing movement of the holding/transfer unit and the loading portion with rotation of the rotational table main body.

According to this configuration, when the rotational table main body is rotated and driven by steps of a predetermined angle after the operator sets the object to be processed on the holding/transfer unit at one processing area, the respective processes are performed at the other plural processing areas covered by the cover case, and the operator can be separated (protected) from the processing units and the like and safety can be ensured. If the cover case is formed by a planar panel or the like, the processing area can be shut off from the outside. On the other hand, through the opening/closing door, transport (feeding) of the object to be processed and recovery of the jig can be performed easily.

3. Advantageous Effect of the Invention

According to the production apparatus having the above configuration, while simplification of the structure, size and cost reduction of the apparatus and the like are achieved, mechanical components, electronic components and the like can be produced by performing predetermined processes in the plurality of processing areas arranged in the ring formation around the rotational table main body, and particularly if the component assembly is to be produced by assembling the subsidiary component to the main component using the jig, the plural types of processes such as pre-inspection, press-fit, caulking, determination on acceptability, sorting and the like are performed and the jig that is no longer needed is recovered, whereby the component assembly can be efficiently produced.

BRIEF DESCRIPTION OF THE DRAWINGS

FIG. 6A is a side view illustrating the holding/transfer unit and a loading portion constituting a part of the production apparatus according to the present invention;

FIG. 6B is a side view illustrating the holding/transfer unit and the loading portion constituting a part of the production apparatus according to the present invention;

FIG. 16 is a plan view illustrating still another embodiment of the production apparatus according to the present invention.

EXPLANATIONS OF LETTERS OR NUMERALS

Figure 1:
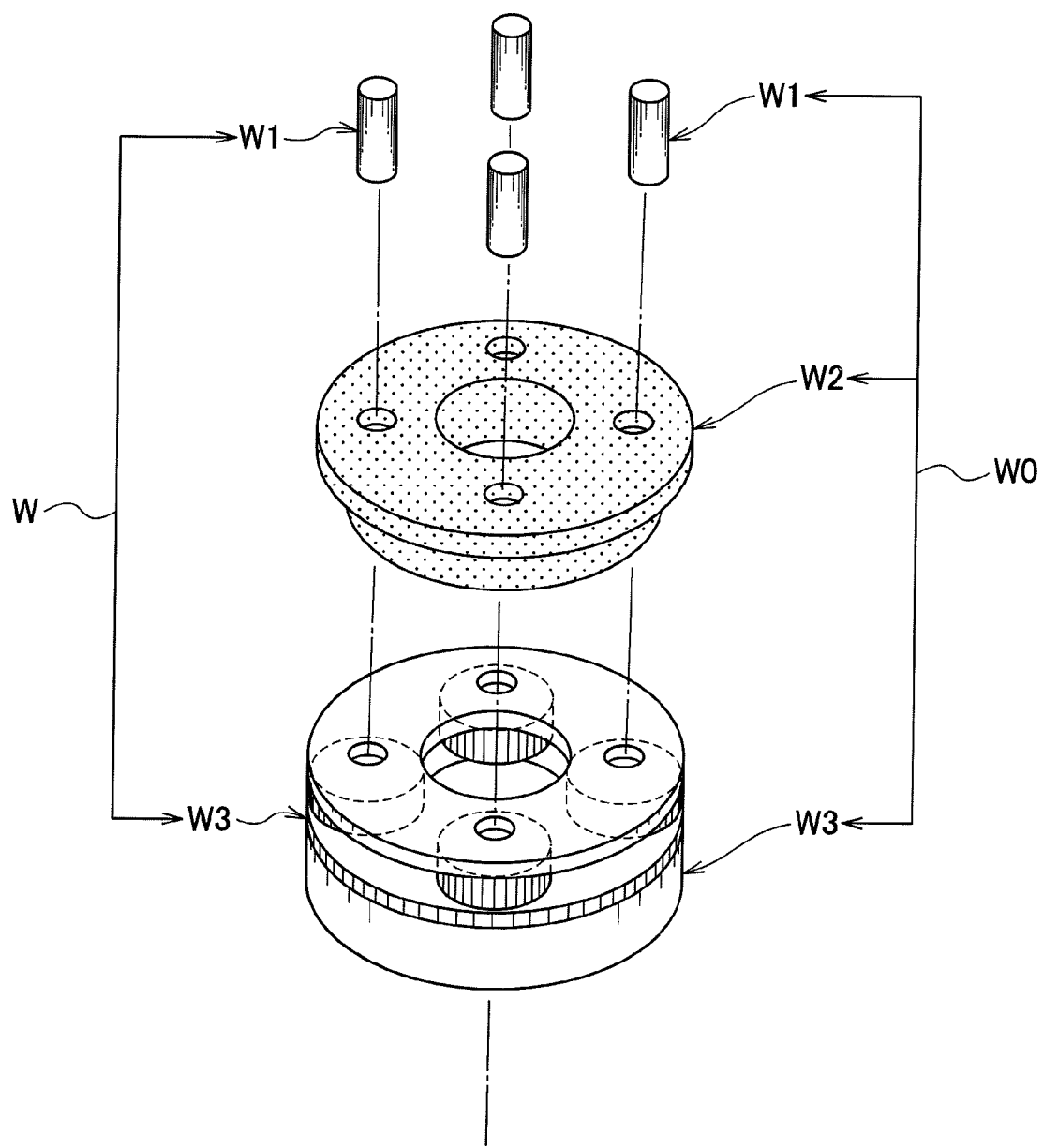
FIG. 1 is an exploded perspective view illustrating a subsidiary component to be processed by a production apparatus of the present invention, a jig for holding the subsidiary component, and a main component to which the jig holding the subsidiary component is set.

W1 subsidiary component
W2 jig
W3 main component
W0 object to be processed
W component assembly
M operator
A1 first processing area
A2 second processing area
A3 third processing area
A4 fourth processing area
A5 fifth processing area
A6 sixth processing area
10 base
20, 20' rotational table main body
21, 21' rotating shaft
22 motor
23 upper disk
24 side wall
25' rotation wheel
26' movable table
30 holding/transfer unit
31 holding portion
31a opening portion
31b recess portion
32 elevation driving mechanism
32a elevation guide
32b slider
32c driving portion
40 loading portion
51 first processing table unit
51a first processing table
51b leg portion
51c base portion
52 second processing table unit
52a second processing table
52b leg portion
52c base portion
53 third processing table unit
53a third processing table
53b leg portion
53c base portion
54 fifth processing table unit
55a fifth processing table
55b leg portion
55c base portion
56 sixth processing table unit
56a sixth processing table
56b leg portion
56c base portion
60 pre-inspection unit
61 visual sensor
70 press-fit unit
71 press-fit pin
72 elevation driving mechanism
80 transfer unit
81 grasping hand
82 elevation driving mechanism
83 guide rail
84 horizontal driving mechanism
90 caulking unit
91 caulking rod
92 elevation driving mechanism
100 determination unit
101 sun gear
102 rotating shaft
103 elevation driving mechanism
104 rotation driving portion
105 determination portion
110, 110' carrying-out unit
111 arm
112 elevation driving mechanism
113 guide rail
114 horizontal driving mechanism
120 accepted product transport line
130 rejected product transport line
140 cover case
141 opening/closing door
150 work table

DETAILED DESCRIPTION OF THE INVENTION

The best mode for carrying out the present invention will be described below referring to the attached drawings. Here, as shown in FIG. 1, a main component W3 in which a plurality of planetary gears are temporarily assembled together with a washer or the like using a temporary pin to a carrier of a planetary gear mechanism constituting a part of a transmission to be mounted on an automobile, a subsidiary component W1, which is an actual pin to be press-fitted into the carrier so as to push out and replace the temporary pin, and a jig W2, which is a carriage to be set to the main component W3 in a state in which the subsidiary component (actual pin) W1 is temporally assembled are shown.

Therefore, an object W0 to be processed is obtained by setting the jig W2 to which the subsidiary component W1 is temporarily assembled onto the main component W3 in which the plurality of planetary gears are temporarily assembled to the carrier using the temporary pin, the subsidiary component (actual pin) W1 is press-fitted into the carrier by a press-fit process and the temporary pin is removed, and the jig W2 which is no longer needed is separated from the carrier and then a component assembly W is obtained.

Figure 2:
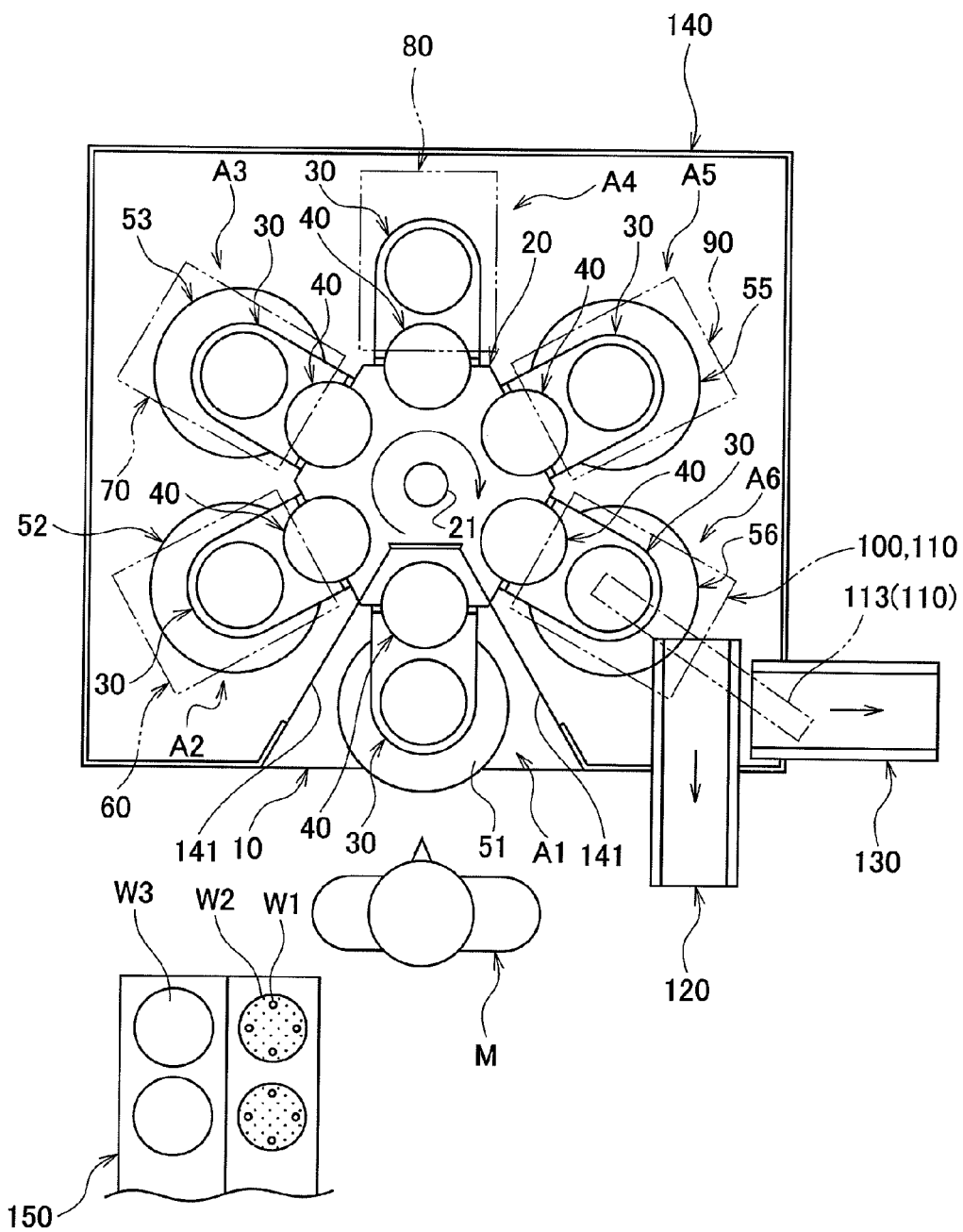
FIG. 2 is a plan view illustrating an embodiment of the production apparatus according to the present invention.

This production apparatus includes, as shown in FIG. 2, a base 10 having a substantially rectangular shape, a rotational table main body 20 arranged on the base 10 and having a substantially hexagonal column shape, six holding/transfer units 30 arranged with an equal interval in the circumference direction of the rotational table main body 20 and provided on the rotational table main body 20, six loading portions 40 provided on the rotational table main body 20 so as to correspond to each of the holding/transfer units 30, a plurality of processing areas (first processing area A1, a second processing area A2, a third processing area A3, a fourth processing area A4, a fifth processing area A5, and a sixth processing area A6) disposed annularly (in a ring formation) around the rotational table main body 20 so as to correspond to the six holding/transfer units 30, a plurality of processing table units (first processing table unit 51, a second processing table unit 52, a third processing table unit 53, a fifth processing table unit 55, and a sixth processing table unit 56) arranged in the plurality of the processing areas, a plurality of processing units (a pre-inspection unit 60, a press-fit unit 70, a transfer unit 80, a caulking unit 90, a determination unit 100, and a carrying-out unit 110) arranged in each of the processing areas, an accepted product transport line 120, a rejected product transport line 130, a cover case 140 for covering the other processing areas excluding the first processing area A1, and the like.

In the vicinity of the first processing area A1, a work table 150 is arranged for loading the jig W2 for temporarily assembling the main component W3 and the subsidiary component W1 (or the jig W2 in a state in which the subsidiary component W1 is temporarily assembled) so that the operator M can perform the transfer work and the temporary assembling work.

Figure 3:
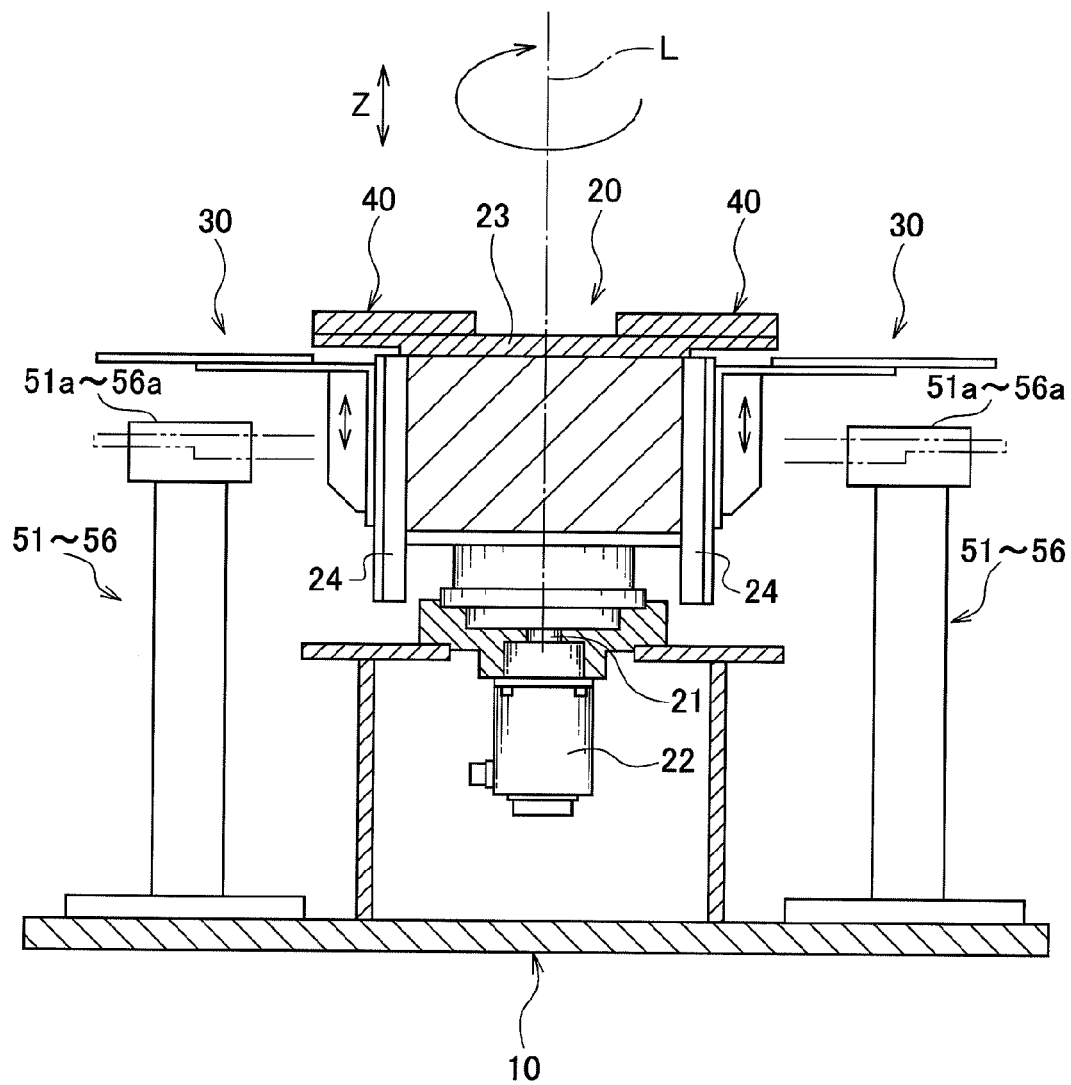
FIG. 3 is an enlarged sectional view illustrating a part of the production apparatus according to the present invention.
Figure 4:
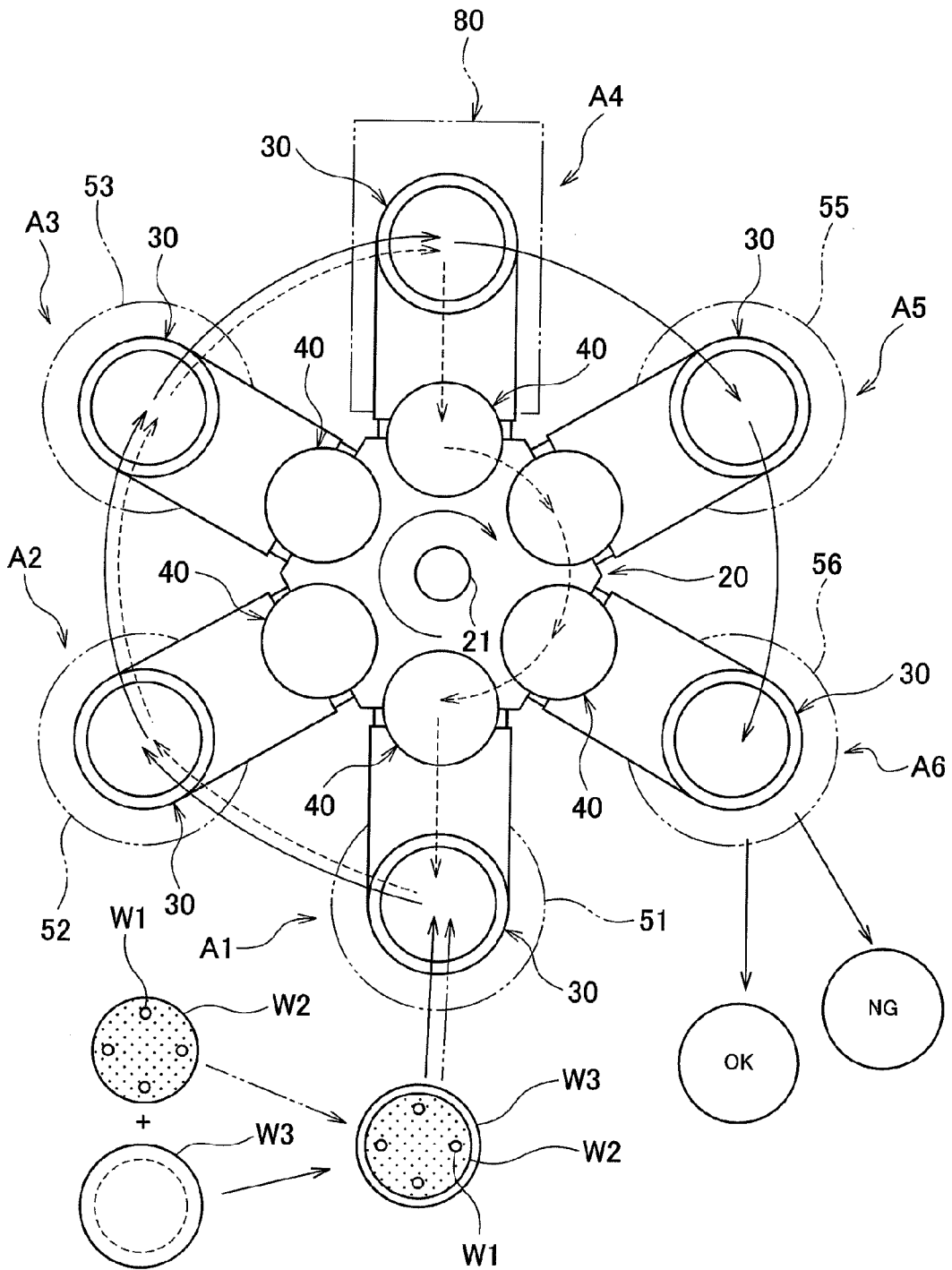
FIG. 4 is a plan view schematically illustrating a flow of an object to be processed and the jig in the production apparatus according to the present invention.

The rotational table main body 20 includes, as shown in FIGS. 2 to 4, a rotating shaft 21 having an axis L extending in the vertical direction Z, a motor 22 intermittently rotating and driving the rotating shaft 21 by steps of a predetermined angle, an upper disk 23 and a side wall 24 formed so as to rotate integrally with the rotating shaft 21, and the like. The upper disk 23 and the side wall 24 are formed so as to define an outer profile of the substantially hexagonal column in general.

The side wall 24 is provided with the six holding/transfer units 30 which are disposed so as to be arranged with an equal interval in the circumference direction of the rotational table main body 20. Also, the upper disk 23 is provided with the six loading portions 40 which are disposed so as to be arranged corresponding to each of the holding/transfer units 30 and at an inside over the holding/transfer units 30 in the radial direction of the rotational table main body 20.

That is, the rotational table main body 20 is integrally provided with the six holding/transfer units 30 and the six loading portions 40 and is to be rotated and driven by steps of a predetermined angle (approximately 60 degrees, here) around the axis L.

Figure 5A:
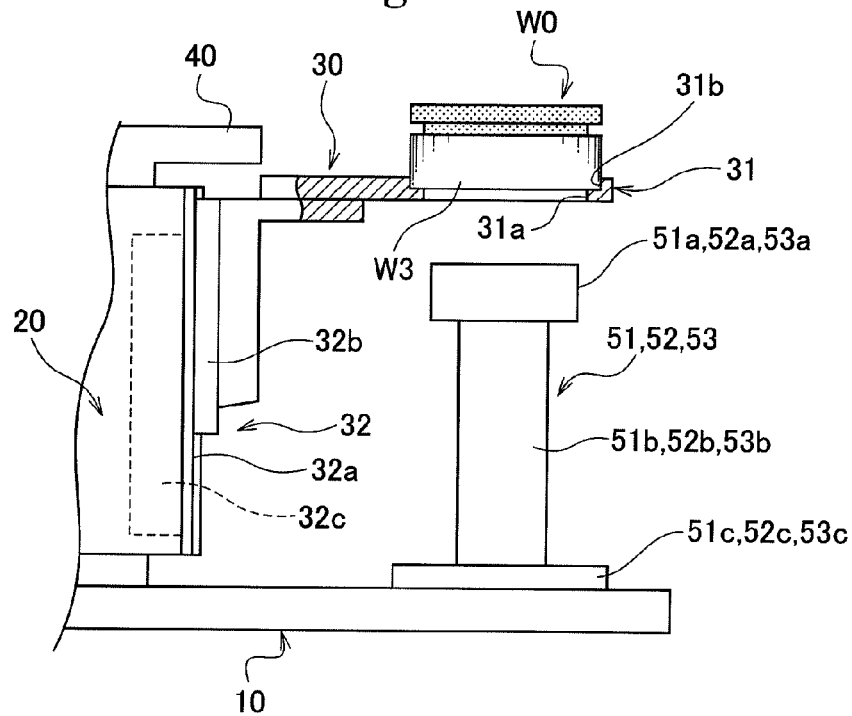
FIG. 5A is a side view illustrating an operation of a holding/transfer unit constituting a part of the production apparatus according to the present invention.
Figure 5B:
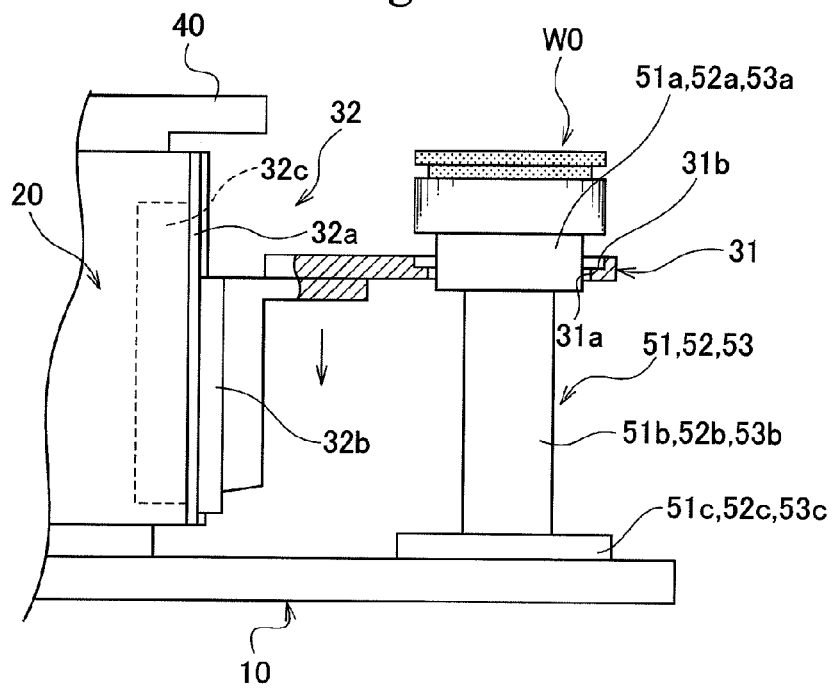
FIG. 5B is a side view illustrating an operation of the holding/transfer unit constituting a part of the production apparatus according to the present invention.

The holding/transfer unit 30 includes, as shown in FIGS. 5A and 5B, a holding portion 31 having a circular opening portion 31a, an elevation driving mechanism 32 for elevating and driving the holding portion 31, and the like.

The holding portion 31 has an annular recess portion 31b around the opening portion 31a so that a lower-face periphery region of the main component W3 is positioned and held in this recess portion 31b. The opening portion 31a is formed with a size that accommodates the first processing table 51a to the sixth processing table 56a in a non-contact manner.

With regard to the holding portion, not limited to the recess portions 31b formed around the opening portion 31a, a plurality of holding portions formed substantially in the L-shape so as to be suspended downward around the opening portion 31a and to protrude inward in the radial direction and also formed so as to accommodate the first processing table 51a to the sixth processing table 56a in a non-contact manner may be employed.

The elevation driving mechanism 32 includes, as shown in FIGS. 5A and 5B, an elevation guide 32a fixed to the side wall 24 and extending in the vertical direction Z, a slider 32b fixedly supporting the holding portion 31 and guided capable of reciprocal movement in the vertical direction Z by the elevation guide 32a, a driving portion 32c for elevating and driving the slider 32b, and the like.

As the driving portion 32c, a ball screw and a ball nut, a pneumatic or hydraulic cylinder, a servo motor, and other mechanisms can be employed.

The holding/transfer unit 30 holds the object W0 to be processed at a predetermined raised position as shown in FIG. 5A and transfers the object W0 to be processed onto the processing table (the first processing table 51a, the second processing table 52a, and the third processing table 53a) and release it at a predetermined lowered position as shown in FIG. 5B.

The holding/transfer unit 30 holds the component assembly W at a predetermined raised position as shown in FIG. 6A in a state in which the jig W2 which is no longer needed is separated from the object W0 to be processed and transferred to the loading portion 40 and transfers the component assembly W onto the processing table (the fifth processing table 55a and the sixth processing table 56a) and release it at a predetermined lowered position as shown in FIG. 6B.

As mentioned above, only by means of the elevating operation of the holding/transfer unit 30, the object W0 to be processed or the component assembly W held thereby can be transferred onto the processing table in the processing area and released and the object W0 to be processed or the component assembly W can be lifted up from the processing table in the processing area and held, and thus, the structure of the holding/transfer unit 30 can be simplified, and the time required for the transfer and holding can be reduced.

The loading portions 40 are, as shown in FIGS. 2 to 4, arranged at an inside in the radial direction over the holding/transfer unit 30 and arranged in the circumference direction of the rotational table main body 20 and fixed on the upper disk 23 of the rotational table main body 20. The loading portion 40 is formed in a substantially disk shape and is capable of loading the jig W2 which is no longer needed. The loading portion 40 may include a cylindrical outer wall portion projecting upward in the periphery thereof in order to prevent the jig W2 from dropping.

As mentioned above, since the loading portion 40 and the holding/transfer unit 30 are aligned in the radial direction on the rotational table main body 20, the jig W2 which is no longer needed can be separated from the component assembly W on the holding/transfer unit 30 to be transferred to the loading portion 40 easily in a short path as shown in FIG. 6A.

Also, around the rotational table main body 20, as shown in FIG. 2, a plurality of the processing areas, that is, the first processing area A1, the second processing area A2, the third processing area A3, the fourth processing area A4, the fifth processing area A5, and the sixth processing area A6 are sequentially arranged with an equal interval in the ring shape (in the circumference direction).

Figure 7:
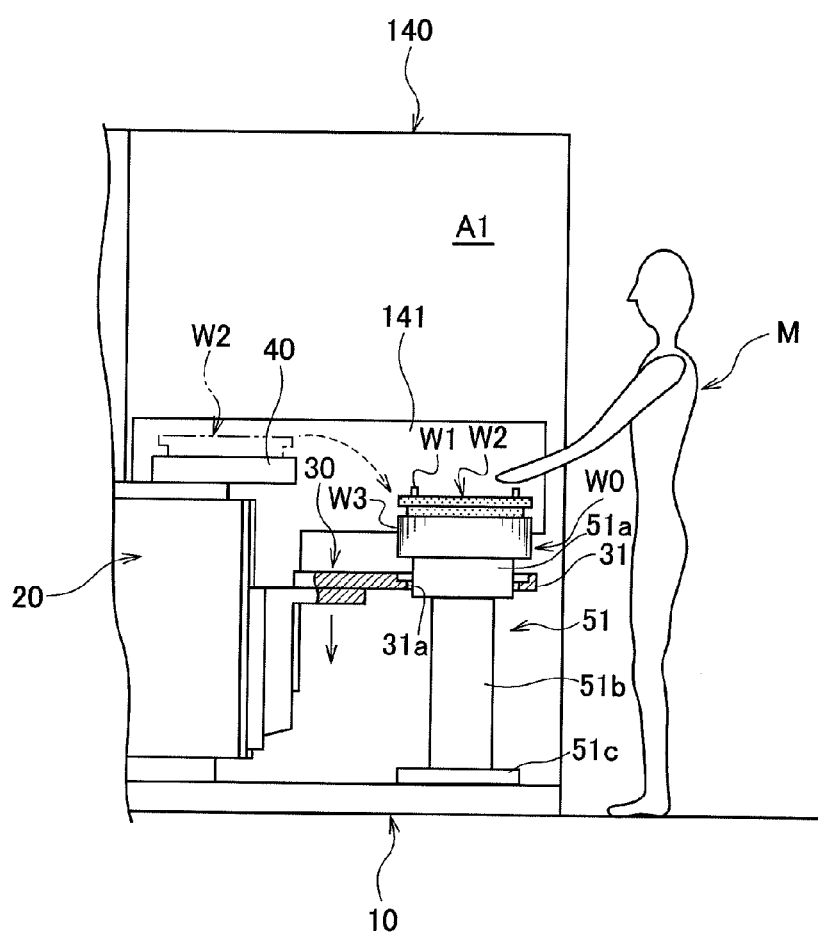
FIG. 7 is a side view illustrating a first processing area and a first processing table unit constituting a part of the production apparatus according to the present invention.

The first processing area A1 is, as shown in FIGS. 2 and 7, arranged outside the cover case 140 and includes the first processing table unit 51 for setting the object W0 to be processed.

The first processing table unit 51 includes, as shown in FIG. 7, the first processing table 51a on which the operator M can load the object W0 to be processed in a state in which the holding/transfer unit 30 is located at a predetermined lowered position, a leg portion 51b supporting the first processing table 51a, and a base portion 51c supporting the leg portion 51b.

In the first processing area A1, the operator M can perform a manual process for loading the object W0 to be processed which is prepared in advance (the object W0 to be processed obtained by temporarily assembling the subsidiary component W1 to the jig W2 and setting the jig W2 to the main component W3) from the work table 150 onto the first processing table 51a or a manual process for loading the main component W3 onto the first processing table 51a and, as shown in a dot line in FIG. 7, setting the jig W2 recovered after the preceding process of the object W0 to be processed onto the main component W3 and then, temporarily assembling the subsidiary component W1 to the jig W2.

Figure 8:
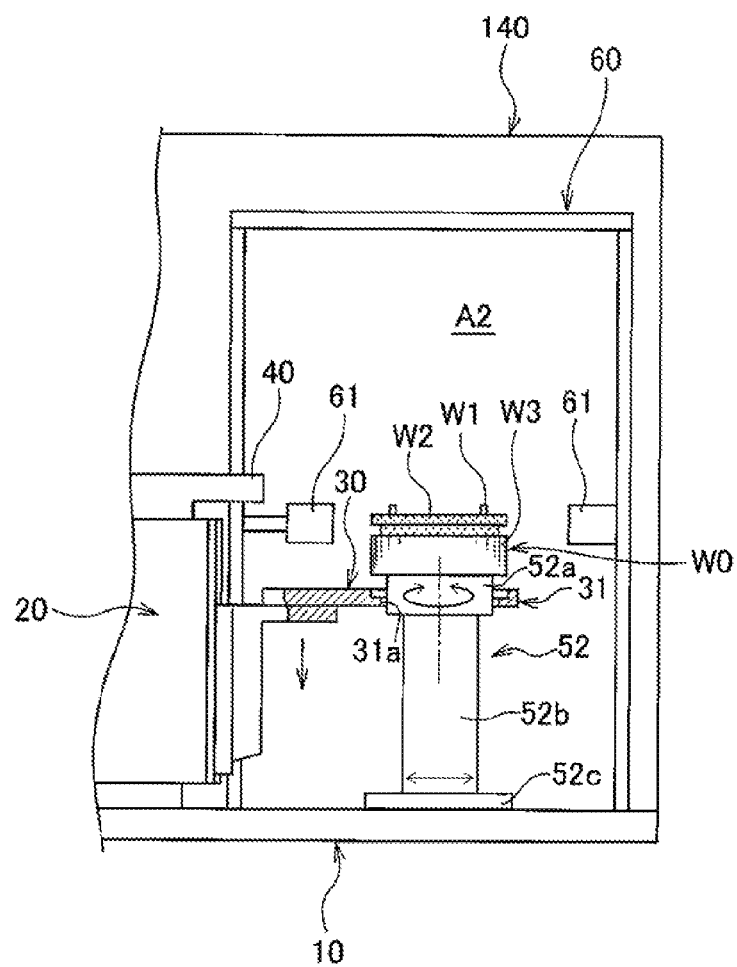
FIG. 8 is a side view illustrating a second processing area, a second processing table unit, and a pre-inspection unit constituting a part of the production apparatus according to the present invention.

The second processing area A2 is, as shown in FIGS. 2 and 8, arranged inside the cover case 140 and includes the second processing table unit 52 for holding the object W0 to be processed having been transferred from the holding/transfer unit 30, and the pre-inspection unit 60 for conducting a pre-inspection of the object W0 to be processed which is held on the second processing table unit 52.

The second processing table unit 52 includes, as shown in FIG. 8, the second processing table 52a capable of loading the object W0 to be processed, a leg portion 52b supporting the second processing table 52a, and a base portion 52c supporting the leg portion 52b and is formed so that the object W0 to be processed can be automatically transferred onto the second processing table 52a when the holding/transfer unit 30 is lowered to a predetermined lowered position.

Here, the leg portion 52b includes a rotation driving mechanism that rotates the second processing table 52a around the vertical axis and can position the second processing table at a predetermined angular position. The base portion 52c includes a horizontal driving mechanism that moves the second processing table 52a in the radial direction of the rotational table main body 20 through the leg portion 52b and can position the second processing table at a predetermined position. That is, the second processing table 52a is formed so as to be movable in the horizontal direction and rotatable around the vertical axis.

The pre-inspection unit 60 includes, as shown in FIG. 8, a plurality of vision sensors 61 and the like and is formed so as to perform an inspection process on whether or not the predetermined number of subsidiary components W1 including the actual pin, the washer (not shown) and the like are temporarily assembled corresponding to the predetermined positions of the main components W3.

Here, the pre-inspection by the pre-inspection unit 60 is performed such that, after the second processing table 52a is moved and positioned in advance at a predetermined position in the horizontal direction according to the type of the object W0 to be processed, the second processing table 52a is rotated around the vertical axis and the object W0 to be processed is appropriately positioned with respect to the vision sensor 61.

Figure 9:
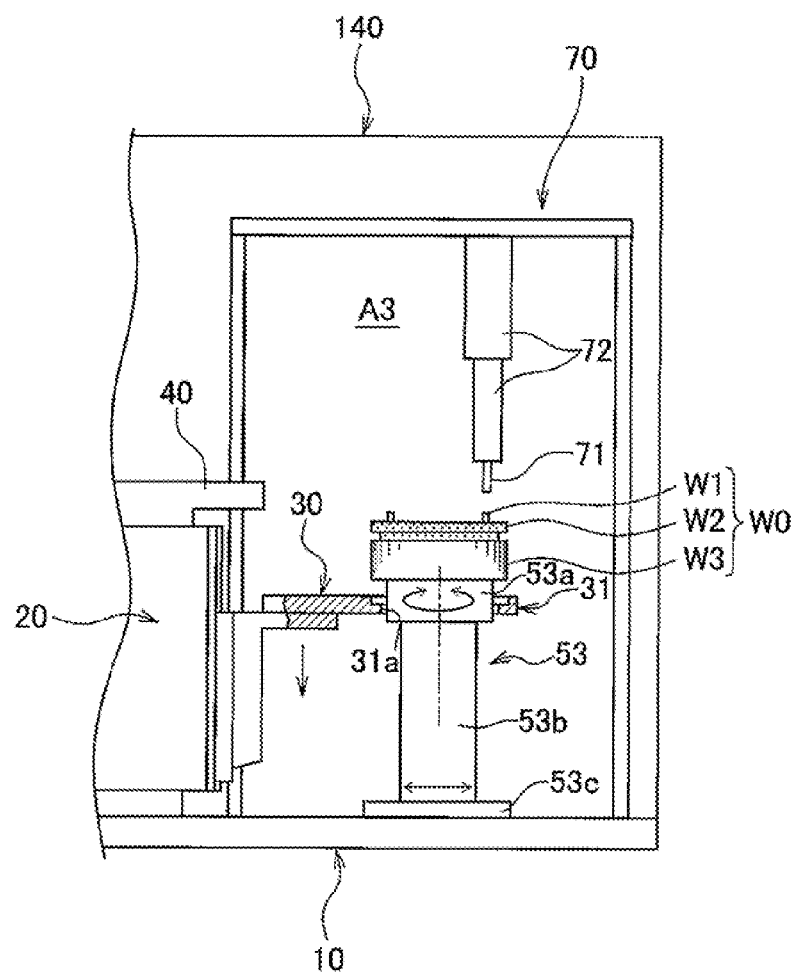
FIG. 9 is a side view illustrating a third processing area, a third processing table unit, and a press-fit unit constituting a part of the production apparatus according to the present invention.

The third processing area A3 is, as shown in FIGS. 2 and 9, arranged inside the cover case 140 and includes the third processing table unit 53 for holding the object W0 to be processed having been transferred from the holding/transfer unit 30 after the pre-inspection and the press-fit unit 70 performing a press-fit process to the object W0 to be processed held on the third processing table unit 53.

The third processing table unit 53 includes, as shown in FIG. 9, the third processing table 53a capable of loading the object W0 to be processed, a leg portion 53b supporting the third processing table 53a, and a base portion 53c supporting the leg portion 53b and is formed so that the object W0 to be processed can be automatically transferred onto the third processing table 53a when the holding/transfer unit 30 is lowered to a predetermined lowered position.

Here, the leg portion 53b includes a rotation driving mechanism that rotates the third processing table 53a around the vertical axis and can position the third processing table at a predetermined angular position. The base portion 53c includes a horizontal driving mechanism that moves the third processing table 53a through the leg portion 53b in the radial direction of the rotational table main body 20 and can position the third processing table at a predetermined position. That is, the third processing table 53a is formed so as to be movable in the horizontal direction and rotatable around the vertical axis.

The press-fit unit 70 includes, as shown in FIG. 9, a press-fit pin 71, an elevation driving mechanism 72 for elevating and driving the press-fit pin 71 and the like and is formed so as to perform the press-fit process for press-fitting the subsidiary component W1 into the main component W3.

Here, the press-fit process by the press-fit unit 70 is performed such that, after the third processing table 53a is moved and positioned in advance at a predetermined position in the horizontal direction according to the type of the object W0 to be processed, the third processing table 53a is rotated around the vertical axis, and the subsidiary component W1 of the object W0 to be processed is positioned immediately below the press-fit pin 71.

The third processing table 53a may include a pin or the like for receiving a press-fit load of the press-fit pin 71 from the lower side or the press-fit unit 70 may include a determining means for determining whether or not the subsidiary component W1 before press-fit is assembled in a predetermined direction.

Figure 10:
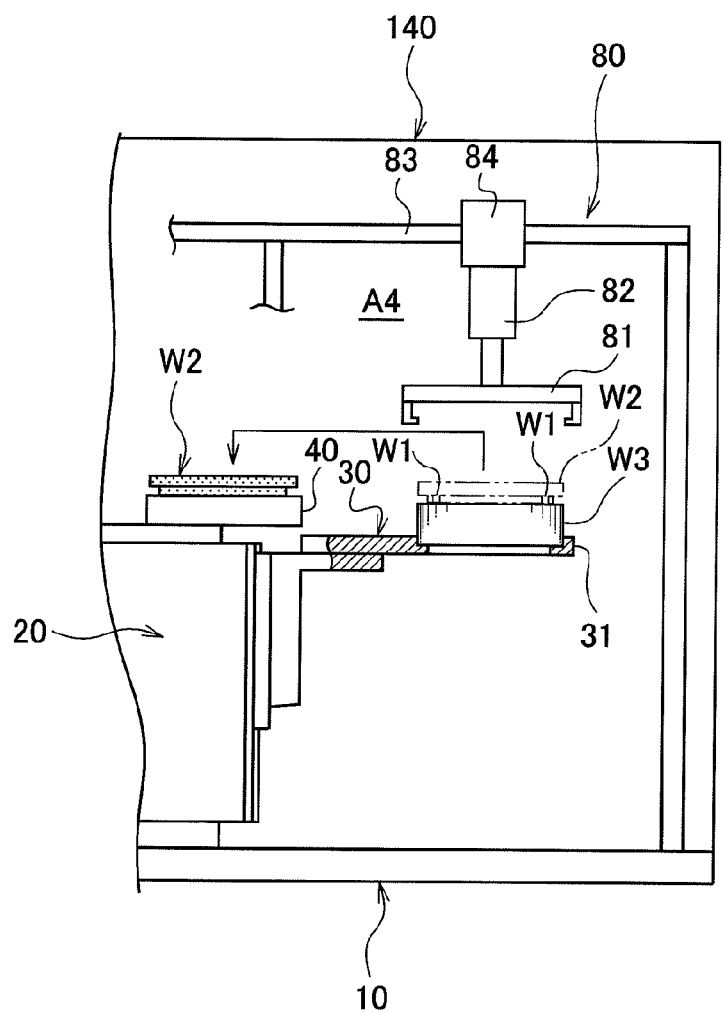
FIG. 10 is a side view illustrating a fourth processing area and a transfer unit constituting a part of the production apparatus according to the present invention.

The fourth processing area A4 is, as shown in FIGS. 2 and 10, arranged inside the cover case 140 and includes the transfer unit 80 that separates the jig W2 from the object W0 to be processed which is carried by the holding/transfer unit 30 and transfers the jig to the loading portion 40 after the press-fit process.

The transfer unit 80 includes, as shown in FIG. 10, a grasping hand 81 that can grasp the periphery of the jig W2, an elevation driving mechanism 82 for elevating and driving the grasping hand 81, a guide rail 83 for guiding the grasping hand 81 and the elevation driving mechanism 82 in the horizontal direction, a horizontal driving mechanism 84 for horizontally driving the grasping hand 81 and the elevation driving mechanism 82 along the guide rail 83 and the like and is formed so as to perform the transfer process for grasping and lifting up (separating) the jig W2 from the object W0 to be processed for which the press-fit process has been finished and transferring the jig to the loading portion 40.

Figure 11:
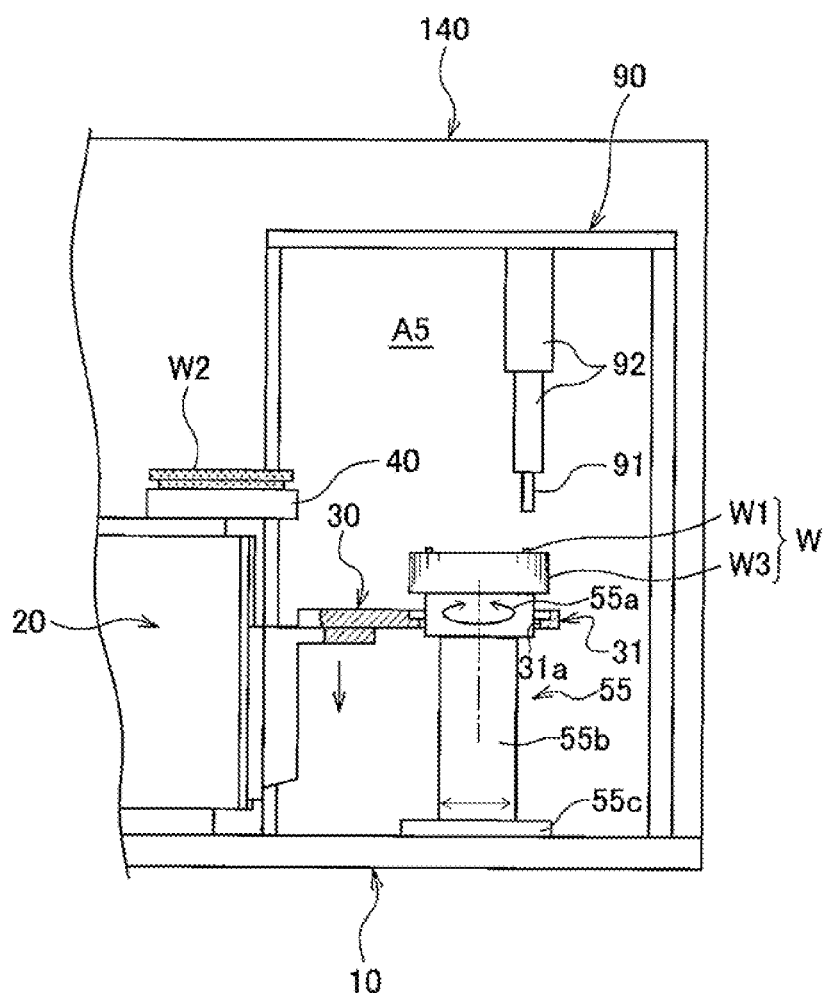
FIG. 11 is a side view illustrating a fifth processing area, a fifth processing table unit, and a caulking unit constituting a part of the production apparatus according to the present invention.

The fifth processing area A5 is, as shown in FIGS. 2 and 11, arranged inside the cover case 140 and includes the fifth processing table unit 55 for holding the component assembly W having been transferred from the holding/transfer unit 30 after the press-fit process and also after the jig W2 has been separated, and the caulking unit 90 for performing a caulking process to the component assembly W held on the fifth processing table unit 55.

The fifth processing table unit 55 includes, as shown in FIG. 11, the fifth processing table 55a that is capable of loading the component assembly W, a leg portion 55b supporting the fifth processing table 55a, and a base portion 55c supporting the leg portion 55b, and is formed so that, when the holding/transfer unit 30 is lowered to a predetermined lowered position, the component assembly W from which the jig W2 has been removed can be automatically transferred onto the fifth processing table 55a.

Here, the leg portion 55b is provided with a rotation driving mechanism that rotates the fifth processing table 55a around the vertical axis and can position the fifth processing table at a predetermined angular position. Also, the base portion 55c is provided with a horizontal driving mechanism that moves the fifth processing table 55a in the radial direction of the rotational table main body 20 through the leg portion 55b and can position the fifth processing table at a predetermined position. That is, the fifth processing table 55a is formed so as to be movable in the horizontal direction and rotatable around the vertical axis.

The caulking unit 90 includes, as shown in FIG. 11, a caulking rod 91, an elevating driving mechanism 92 for elevating and driving the caulking rod 91 and the like and is formed so as to perform a caulking process to the subsidiary component W1 that is press-fitted in the main component W3.

Here, the caulking process by the caulking unit 90 is performed such that after the fifth processing table 55a is moved and positioned in advance at a predetermined position in the horizontal direction according to the type of the component assembly W, the fifth processing table 55a is rotated around the vertical axis, and the subsidiary component W1 of the component assembly W is positioned immediately below the caulking rod 91.

The fifth processing table 55a may be provided with a caulking rod or the like receiving a caulking load of the caulking rod 91 from below.

Figure 12:
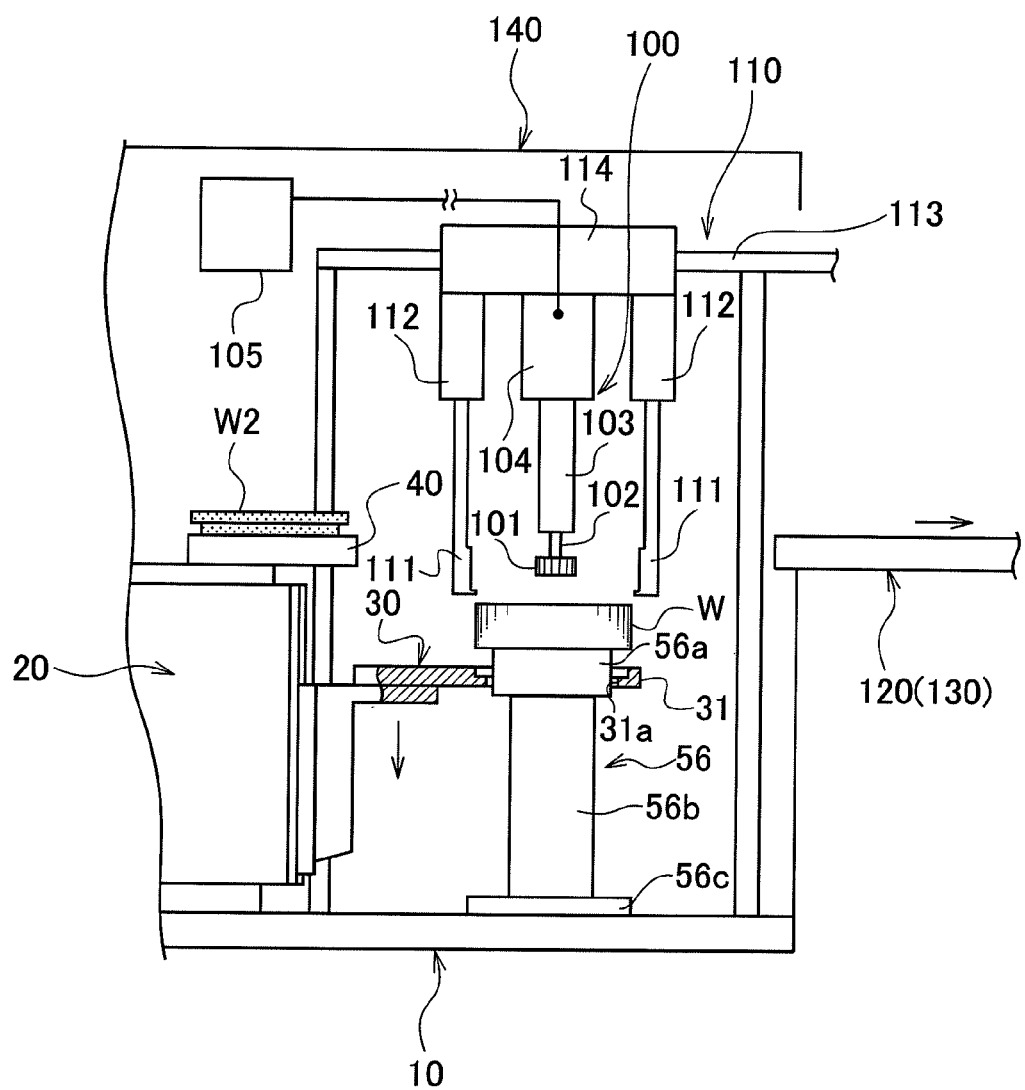
FIG. 12 is a side view illustrating a sixth processing area, a sixth processing table unit, and a determination unit constituting a part of the production apparatus according to the present invention.
Figure 13:
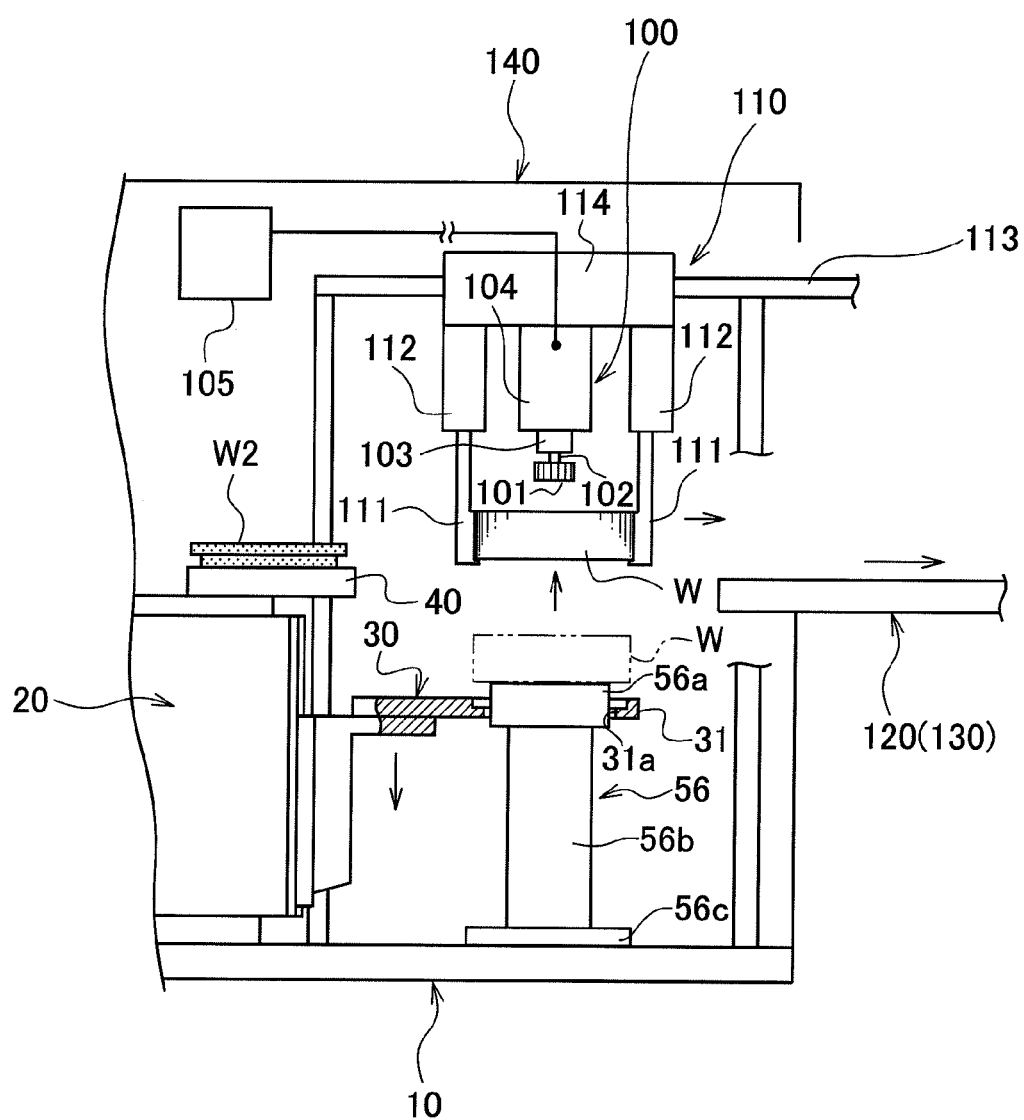
FIG. 13 is a side view illustrating the sixth processing area, the sixth processing table unit, and a carrying-out unit constituting a part of the production apparatus according to the present invention.

The sixth processing area A6 includes, as shown in FIGS. 2, 12, and 13, the sixth processing table unit 56 for holding the component assembly W having been transferred from the holding/transfer unit 30 after the caulking process, the determination unit 100 for determining acceptance/rejection while grasping and lifting the component assembly W held on the sixth processing table unit 56, and the carrying-out unit 110 for sorting the component assembly W for which the determination process has been finished into acceptance and rejection and carrying it out.

The sixth processing table unit 56 includes, as shown in FIGS. 12 and 13, the sixth processing table 56a that is capable of loading the component assembly W, a leg portion 56b supporting the sixth processing table 56a, and a base portion 56c supporting the leg portion 56b, and is formed so that, when the holding/transfer unit 30 is lowered to a predetermined lowered position, the component assembly W from which the jig W2 has been removed can be automatically transferred onto the sixth processing table 56a.

Here, the leg portion 56b is provided with a rotation driving mechanism that rotates the sixth processing table 56a around the vertical axis and can position the sixth processing table at a predetermined angular position. Also, the base portion 56c is provided with a horizontal driving mechanism that moves the sixth processing table 56a in the radial direction of the rotational table main body 20 through the leg portion 56b and can position the sixth processing table at a predetermined position. That is, the sixth processing table 56a is formed so as to be movable in the horizontal direction and rotatable around the vertical axis.

The determination unit 100 includes, as shown in FIGS. 12 and 13, a sun gear 101 that can be meshed with a gear in the component assembly W, a rotating shaft 102 for rotating and driving the sun gear 101, an elevation driving mechanism 103 for elevating and driving the rotating shaft 102, a rotation driving portion 104 for exerting a driving power to the rotating shaft 102 and capable of checking a torque, a determination portion 105 for determining acceptance/rejection based on the torque information of the rotation driving portion 104 and the like and is formed so as to perform a determination process on acceptance/rejection of the component assembly W for which the caulking process has been finished.

The carrying-out unit 110 includes, as shown in FIGS. 12 and 13, an arm 111 that is capable of holding and releasing the component assembly W, an elevation driving mechanism 112 for elevating the arm 111, a guide rail 113 for guiding the arm 111 and the elevation driving mechanism 112 in the horizontal direction, a horizontal driving mechanism 114 for moving the arm 111 and the elevation driving mechanism 112 along the guide rail 113 as well as the sun gear 101, the rotating shaft 102, the elevation driving mechanism 103, and the rotation driving portion 104 together in the horizontal direction and the like.

The guide rail 113 is, as shown in FIG. 2, arranged so as to be opposed the accepted product transport line 120 and the rejected product transport line 130 from above.

It is formed so that after the arm 113 holds the component assembly W, the elevation driving mechanism 112 raises the arm 112, the horizontal driving mechanism 114 moves the arm 111 along the guide rail 113 only for a predetermined distance and transfers the component assembly onto the accepted product transport line 120 or onto the rejected product transport line 130 and positions it, the elevation driving mechanism 112 lowers the arm 111 and releases the accepted component assembly W onto the accepted product transport line 120 or releases the rejected component assembly W onto the rejected product transport line 130.

That is, the carrying-out unit 110 is formed such that, after the component assembly W is held, the component assembly W is transferred onto the accepted product transport line 120 or onto the rejected product transport line 130 only by linear horizontal movement along the guide rail 113. Therefore, only by the horizontal movement of the carrying-out unit 110 for linearly different distances, the carrying-out unit can carry out the accepted product onto the accepted product transport line 120 or carry out the rejected product onto the rejected product transport line 130.

Accordingly, the carrying-out unit 110 can be made with a simple structure and is capable of a smooth carrying-out operation while the component assembly W is sorted to the accepted product or the rejected product in a simple control sequence.

Here, the determination unit 100 is formed so as to perform the predetermined determination process while grasping and lifting the component assembly W held on the sixth processing table 56a by the carrying-out unit 110. Therefore, the carrying-out operation by the carrying-out unit 110 becomes possible while the determination process is being performed, and the time required for the entire determination process and the carrying-out process can be reduced.

The accepted product transport line 120 is a conveyer in the form of a belt conveyer, a roller conveyer and others and is formed so as to transport the accepted component assembly W having been transferred by the carrying-out unit 110 to a predetermined containing area.

The rejected product transport line 130 is a conveyer in the form of a belt conveyer, a roller conveyer and others and is formed so as to transport the rejected component assembly W having been transferred by the carrying-out unit 110 to a predetermined containing area.

The cover case 140 is, as shown in FIG. 2, formed so as to cover the second processing area A2 to the sixth processing area A6 excluding the first processing area A1 for setting the object W0 to be processed to the holding/transfer unit 30.

Both side walls opposing the first processing area A1 are, as shown in FIGS. 2 and 7, provided with opening/closing doors 141 for allowing movement of the holding/transfer unit 30 and the loading portion 40 with rotation of the rotational table main body 20.

After the operator M sets the object W0 to be processed to the holding/transfer unit 30 in the first processing area A1, the rotational table main body 20 is rotated by steps of a predetermined angle, and the respective processes are performed in the other processing areas A2 to A6 covered by the cover case 140. Therefore, the operator M can be insulated (protected) from the processing units 60, 70, 80, 90, 100, 110 and the like and safety can be ensured and, if the cover case 140 is formed by a planar panel or the like, the processing areas A2 to A6 can be shut off from the outside.

On the other hand, carrying (feeding) of the object W0 to be processed and recovery of the jig W2 can be easily performed through the opening/closing door 141.

Subsequently, a processing operation of the above apparatus will be described referring to FIGS. 4 and 7 to 13.

First, as shown in FIGS. 4 and 7, in the first processing area A1, in a state in which the holding/transfer unit 30 is lowered to a predetermined lowered position, the object W0 to be processed is set by the operator M on the first processing table 51a.

Here, if the apparatus is operated for the first time, by means of the manual operation of the operator M, as indicated by a two-dot chain line and a solid line in FIG. 4, the object W0 to be processed prepared in advance (the object W0 to be processed obtained by temporarily assembling the subsidiary component W1 to the jig W2 and then, setting the jig W2 to the main component W3) is loaded from the work table 150 onto the first processing table 51a. Then, when the holding/transfer unit 30 is raised to a predetermined raised position and holds the object W0 to be processed and the rotational table main body 20 is rotated by a predetermined angle (approximately 60 degrees), the object W0 to be processed is transferred to the second processing area A2. Next, when the holding/transfer unit 30 having been moved to the first processing area A1 is lowered to the predetermined lowered position, the new object W0 to be processed is loaded onto the first processing table 51a by means of the manual operation of the operator M, and similarly, the six objects W0 to be processed are set sequentially. After the six objects W0 to be processed have been set, similarly by means of the manual operation of the operator M, the main component W3 is sequentially loaded from the work table 150 onto the first processing table 51a with the rotation of the rotational table main body 20, the jig W2 recovered along the flow indicated by a dot line in FIG. 4 is picked up from the loading portion 40 and is set on the main component W3 loaded onto the first processing table 51a as indicated by a dot line in FIG. 7, and moreover, the subsidiary component W1 is temporarily assembled to the jig W2.

Subsequently, in the second processing area A2, when the holding/transfer unit 30 is lowered to the predetermined lowered position, the object W0 to be processed is transferred onto the second processing table 52a. Then, the second processing table 52a is rotated and driven in one direction around the vertical axis and the object W0 to be processed is subjected to the pre-inspection by the pre-inspection unit 60 (vision sensor 61) (on whether or not the washer or the like is temporarily assembled to each planetary gear in a predetermined order).

When the pre-inspection is finished, the second processing table 52a is rotated and driven in the opposite direction and the object W0 to be processed is returned to the initial state loaded on the second processing table 52a. After that, when the holding/transfer unit 30 is raised to the predetermined raised position and holds the object W0 to be processed and the rotational table main body 20 is rotated by the predetermined angle (approximately 60 degrees), the object W0 to be processed is transferred to the third processing area A3.

In this pre-inspection, if it is determined to be NG, the object W0 to be processed is carried out to the rejected product transport line 130 in a state assembled with the jig W2 and the subsidiary component W1 without being subjected to the processes in the subsequent third processing area A3 to the fifth processing area A5 and the determination process in the sixth processing area A6.

Subsequently, in the third processing area A3, when the holding/transfer unit 30 is lowered to the predetermined lowered position, the object W0 to be processed is transferred onto the third processing table 53a. Then, by means of the press-fit unit 70, the subsidiary component (actual pin) W1 is press-fitted into the main component W3, and a temporary pin having been assembled in advance is pushed out and discharged to the outside.

Here, in the press-fit process, the third processing table 53a is rotated and driven in one direction around the vertical axis, and the subsidiary component (actual pin) W1 of the object W0 to be processed (arranged above the planetary gear) is subjected to the press-fit process by the press-fit pin 71. As a result, the object W0 to be processed is constituted by the component assembly W and the jig W2.

When the press-fit process is finished, the third processing table 53a is rotated and driven in the opposite direction, the object W0 to be processed is returned to the initial state loaded on the third processing table 53a. After that, when the holding/transfer unit 30 is raised to the predetermined raised position and holds the object W0 to be processed and the rotational table main body 20 is rotated by the predetermined angle (approximately 60 degrees), the object W0 to be processed is transferred to the fourth processing area A4.

Subsequently, in the fourth processing area A4, when the holding/transfer unit 30 is stopped at a predetermined angular position in a state raised to the predetermined raised position, by means of the transfer unit 80, the jig W2 which is no longer needed is separated from the object W0 to be processed held on the holding/transfer unit 30 and is transferred to the loading portion 40 located at the inside in the radial direction. As a result, only the component assembly W is held on the holding/transfer unit 30. After that, when the rotational table main body 20 is rotated by the predetermined angle (approximately 60 degrees), the component assembly W from which the jig W2 has been removed is transferred to the fifth processing area A5.

Subsequently, in the fifth processing area, when the holding/transfer unit 30 is lowered to the predetermined lowered position, the component assembly W is transferred onto the fifth processing table 55a. Then, the component assembly W held on the fifth processing table 55a is subjected to the caulking process by the caulking unit 90.

Here, in the caulking process, the fifth processing table 55a is rotated and driven in one direction around the vertical axis, and the subsidiary component (actual pin) W1 of the component assembly W is subjected to the caulking process by the caulking rod 91.

When the caulking process is finished, the fifth processing table 55a is rotated and driven in the opposite direction, and the component assembly W is returned to the initial state loaded on the fifth processing table 55a. After that, when the holding/transfer unit 30 is raised to the predetermined raised position and holds the component assembly W and the rotational table main body 20 is rotated by the predetermined angle (approximately 60 degrees), the component assembly W is transferred to the sixth processing area A6.

Subsequently, in the sixth processing area, when the holding/transfer unit 30 is lowered to the predetermined lowered position, the component assembly W is transferred onto the sixth processing table 56a. Then, while the component assembly W held on the sixth processing table 56a is grasped by the arm 111 of the carrying-out unit 110 and lifted up, the sun gear 101 of the determination unit 100 is meshed with the gear in the component assembly W and subjected to the determination process (torque check), and based on the obtained torque information, the determination unit 100 determines whether the component assembly W is an accepted product or a rejected product.

Subsequently, based on the determination result, by means of the carrying-out unit 110, the component assembly W for which the determination process has been finished is sorted and carried out to the accepted product transport line 120 if it is accepted, while the assembly is carried out to the rejected product transport line 130 if it is rejected.

After that, when the holding/transfer unit 30 is raised to the predetermined raised position and then, the rotational table main body 20 is rotated by the predetermined angle (approximately 60 degrees), the jig W2 loaded on the loading portion 40 is returned to the initial first processing area A1.

As mentioned above, in the sixth processing area A6, since two processes including the determination process and the carrying-out process of the component assembly W are performed, simplification, integration, and cost reduction of the apparatus can be achieved and productivity can be improved as compared with an apparatus provided with the respective processing areas.

That is, in this production apparatus, the object W0 to be processed and the component assembly W are carried out following the flow indicated by the solid line in FIG. 4, while the jig W2 is recovered following the flow indicated by the dot line in FIG. 4. As mentioned above, the predetermined processes are sequentially performed in the first processing area A1 to the sixth processing area A6, whereby the component assembly W can be efficiently produced.

Particularly, in case the component assembly W is to be produced by assembling the subsidiary component W1 to the main component W3 using the jig W2, by going through the plurality of processes performed sequentially with the rotation of the rotational table main body 20, the component assembly W can be efficiently produced while the jig W2 which is no longer needed is recovered.

As mentioned above, according to this apparatus, the object W0 to be processed is transported by (the holding/transfer unit 30 of) the rotational table main body 20 and the predetermined processes performed to the object W0 to be processed are performed after the object W0 to be processed is transferred to the processing tables located in the processing areas A2 to A6 (the second processing table 52a, the third processing table 53a, the fifth processing table 55a, and the sixth processing table 56a), whereby a load generated by the process does not have to be received by the rotational table main body 20, and the size reduction and simplification of the rotational table main body 20 can achieved.

Also, since the jig W2 which is no longer needed is transferred to the loading portion 40 and returned to the initial processing area (the first processing area A1) with the rotation of the rotational table main body 20, the jig W2 is set to the main component W3 in a state in which the subsidiary component W1 is temporarily assembled using the jig W2 again, and the similar processing can be repeated.

Figure 14:
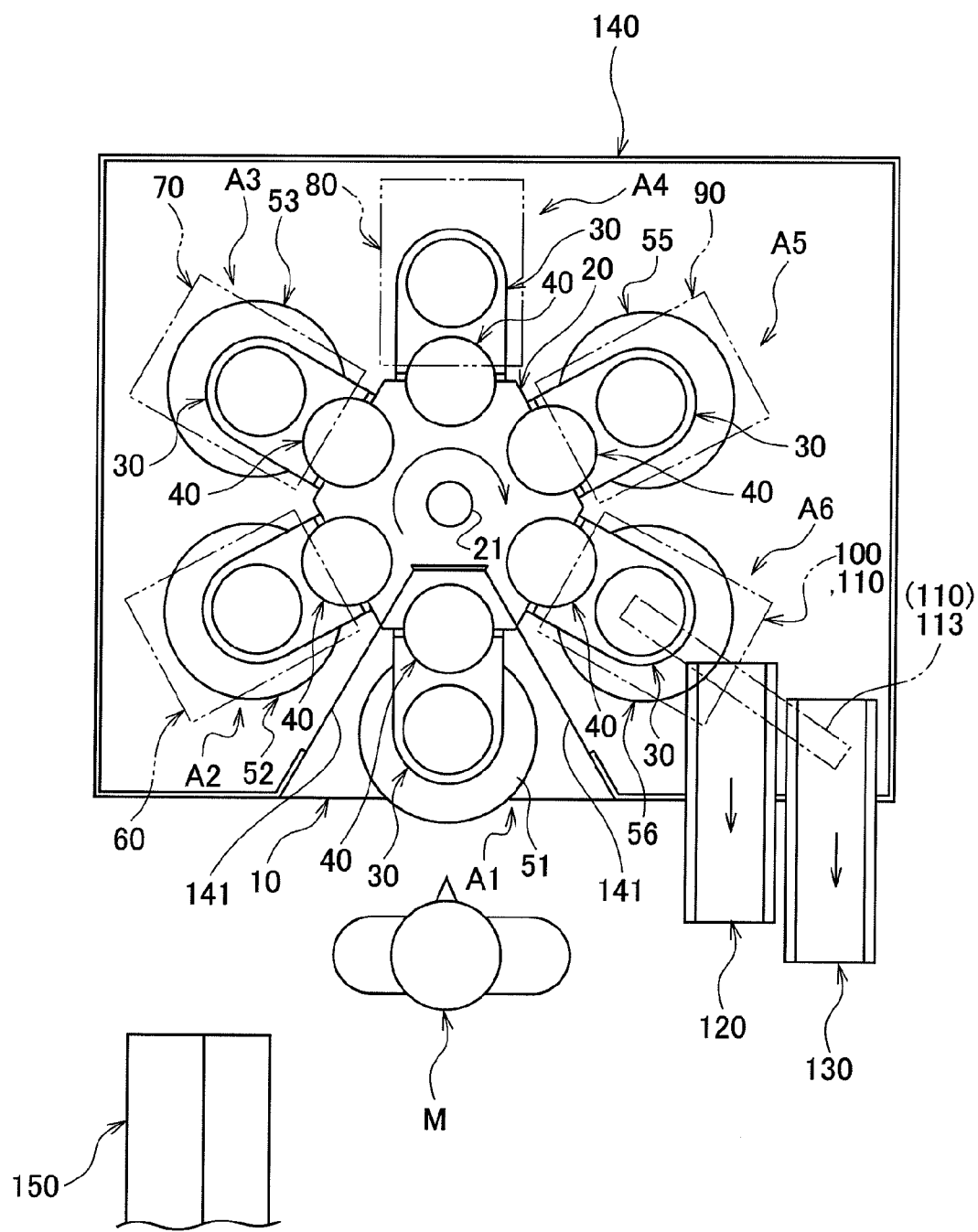
FIG. 14 is a plan view illustrating another embodiment of the production apparatus according to the present invention.

FIG. 14 is a plan view illustrating another embodiment of the production apparatus according to the present invention. In this embodiment, the accepted product transport line 120 and the rejected product transport line 130 are arranged in parallel, and the guide rail 113 is arranged so as to be opposed the accepted product transport line 120 and the rejected product transport line 130 from above.

In this embodiment, too, similarly to the above, the carrying-out unit 110 is to move the component assembly W onto the accepted product transport line 120 or the rejected product transport line 130 only by linear horizontal movement after holding the component assembly W. Therefore, only by the horizontal movement of the carrying-out unit 110 for linearly different distances, the accepted product can be carried out onto the accepted product transport line 120 or the rejected product can be carried out onto the rejected product transport line 130, and the component assembly W can be carried out smoothly with a simple control sequence.

Figure 15A:
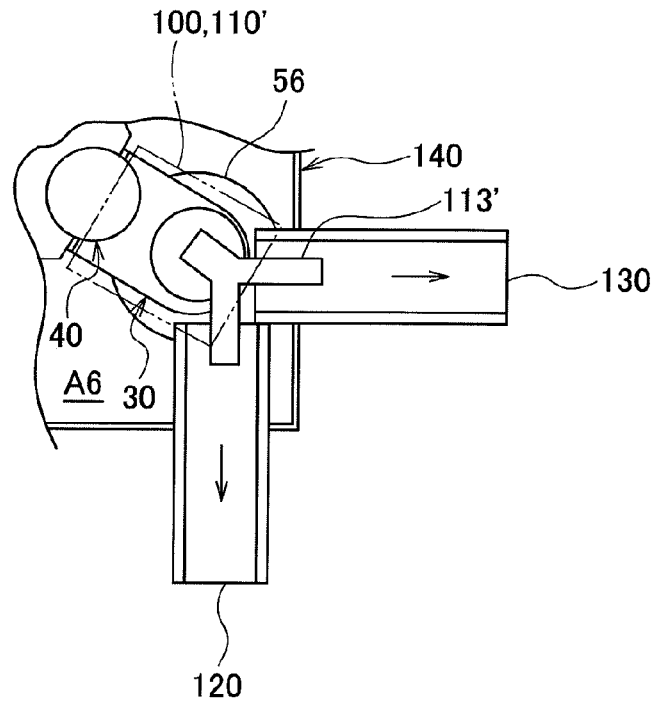
FIG. 15A is a plan view illustrating another embodiment of the carrying-out unit and a transport line constituting a part of the production apparatus according to the present invention.
Figure 15B:
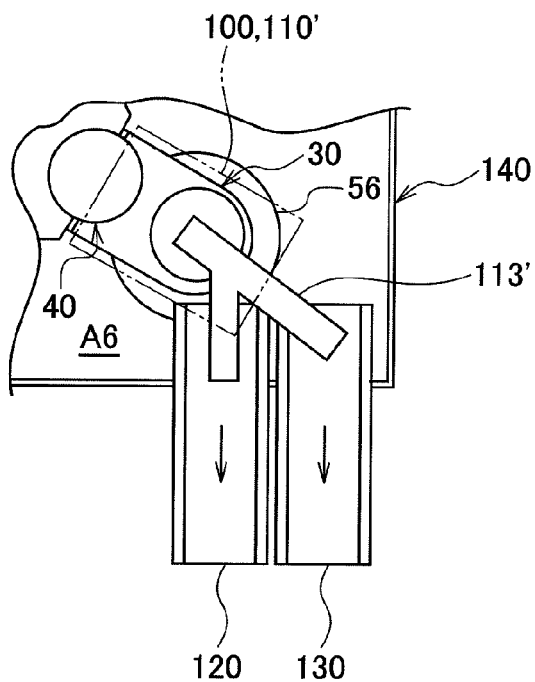
FIG. 15B is a plan view illustrating still another embodiment of the carrying-out unit and the transport line constituting a part of the production apparatus according to the present invention.

FIGS. 15A and 15B are partial plan views illustrating still another embodiment of the production apparatus according to the present invention. In these embodiments, the accepted product transport line 120 and the rejected product transport line 130 are arranged substantially perpendicular to each other or in parallel, a guide rail 113' is formed by being bifurcated into two branches and arranged so as to be opposed the accepted product transport line 120 and the rejected product transport line 130 from above.

In this embodiment, a carrying-out unit 110' holds the component assembly W and then, transfers the component assembly W onto the accepted product transport line 120 or the rejected product transport line 130 by two-dimensional horizontal movement. In this embodiment, too, the accepted product can be carried out onto the accepted product transport line 120 or the rejected product can be carried out onto the rejected product transport line 130, and the component assembly W can be carried out smoothly.

In the above embodiments, as the rotational table main body 20, a disk shaped table rotating around a single rotating shaft 21 is shown and the configuration in which the plurality of processing areas A1 to A6 are arranged in the ring formation around the rotational table main body 20 is shown, but not limited to that, a configuration in which the rotational table main body is rotated in an oval state or an elliptic state and a configuration in which a plurality of processing areas are arranged in the oval or elliptic formation around the rotational table main body are also included in the scope of the present invention.

In this case, as shown in FIG. 16, for a rotational table main body 20', a configuration in which at least two rotating shafts 21' arranged with a predetermined distance, for example, two rotating wheels 25' rotating around each of the rotating shafts 21', and bendable and movable table 26' in an endless track state wound around the two rotating wheels 25' and rotating in an oval or an elliptic shape may be employed, and a configuration in which a plurality of the holding/transfer units 30 and a plurality of loading portions 40 as mentioned above are provided with respect to the movable table 26' may be employed.

In the above embodiments, the six processing areas (the first processing area A1 to the sixth processing area A6) as a plurality of processing areas, the six holding/transfer units 30, and the six loading portions 40 are shown, but not limited to that, five or less or seven or more processing areas, five or less or seven or more holding/transfer units 30, and five or less or seven or more loading portions 40 may be employed.

In the above embodiments, the case in which only the transfer unit 80 is arranged in the fourth processing area A4 is shown, but not limited to that, the fourth processing table unit may be arranged and a processing unit for performing other process may be arranged.

In the above embodiments, in the sixth processing area A6, the case in which the determination unit 100 and the carrying-out unit 110 are arranged together is shown, but not limited to that, and it may be so configured that the determination unit 100 and the sixth processing table unit 56 are arranged in the sixth processing area A6, a seventh processing area is newly provided, and in the seventh processing area, the carrying-out unit and the seventh processing table unit are arranged.

In the above embodiments, the case in which the press-fit unit 70 and the third processing table unit 53 are arranged in the third processing area A3 is shown, but not limited to that, and it may be so configured that the transfer unit 80 is arranged together in the third processing area A3 and another processing unit is arranged in the fourth processing area or the fourth processing area A4 is disused.

In the above embodiments, the case in which the operator M sets the object W0 to be processed by means of a manual operation in the first processing area A1 is shown, but not limited to that, all processes may be automated by arranging an automatic set unit which performs setting automatically.

In the above embodiments, the actual pin or the like as the subsidiary component W1, the carrier as the main component W3, and the carriage for temporarily assembling the subsidiary component W1 (actual pin) or the like as the jig W2 are shown, but not limited to that, and other subsidiary components, other main components, and other jigs can be applied.

INDUSTRIAL APPLICABILITY

As mentioned above, it is needless to say that the production apparatus of the present invention can be applied not only to production of component assemblies in which a subsidiary component is assembled to a main component using a jig while performing a plurality of types of processes such as pre-inspection, press-fit, caulking, acceptance determination, sorting and the like in a field handling mechanical components or electronic components and the like, but not limited to the above types of processes or not limited to the fields handling the mechanical components and electronic components and the like, the production apparatus of the present invention is also useful in the other fields handling other components, products and the like.

The invention claimed is:

1. A production apparatus for producing a component assembly by sequentially performing predetermined processes on an object to be processed in which object a jig for holding a subsidiary component is set to a main component, the production apparatus comprising:
   a rotational table main body that has an upper disk and a lower end, as well as a peripheral side wall located between the upper disk and the lower end, the rotational table main body being intermittently rotatable about an axis;
   a plurality of processing areas arranged in a ring formation about the rotational table main body;
   a plurality of processing tables, each arranged in a respective one of the plurality of processing areas;
   a plurality of holding and transferring-units that are disposed on the side wall of the rotational table main body so as to be spaced from one another in a circumferential direction of the rotational table main body, and that are supported on the side wall of the rotational table main body so as to rotate integrally with the rotational table main body, wherein the holding and transferring units are each capable of holding the object or the component assembly and are each capable of transferring the object or the component assembly from the rotational table main body and respective holding and transferring unit onto one of the plurality of processing tables;
   a plurality of loading portions that are provided on the upper disk of the rotational table main body, the loading portions being positioned so as to each correspond to a respective one of the plurality of holding and transferring units, wherein the loading portions are each capable of having the jig loaded thereon; and
   a plurality of processing units disposed in order to perform the predetermined processes in the plurality of processing areas.

2. The production apparatus according to claim 1, and further comprising an additional processing area and an additional processing unit disposed so as to perform a predetermined process on the object in the additional processing area, wherein the additional processing unit includes a transfer unit for separating the jig from the object for which a predetermined process has been finished, and for transferring the jig to one of the plurality of loading portions.

3. The production apparatus according to claim 1, wherein each of the plurality of holding and transferring units are operable to hold the object or the component assembly at a respective first position and to transfer and release the object or the component assembly onto a respective one of the processing tables at a respective second position.

4. The production apparatus according to claim 3, wherein each of the plurality of loading portions is positioned radially inward relative to the corresponding holding and transferring unit.

5. The production apparatus according to claim 3, wherein at least one of the processing tables is formed so as to be movable in a horizontal direction and rotatable around a vertical axis, and
   wherein each of the holding and transferring units includes a holding portion and an elevation driving mechanism for elevating and driving the respective holding portion, each of the elevation driving mechanisms being provided on the side wall of the rotational table main body.

6. The production apparatus according to claim 5, wherein each of the elevation driving mechanisms include:
   a respective vertical elevation guide fixed to the side wall of the rotational table main body;
   a respective slider movably supported in the respective elevation guide and fixedly supporting the respective holding portion; and
   a respective driving portion for elevating and driving the respective slider.

7. The production apparatus according to claim 1, wherein one of the plurality of processing units is formed so as to perform a predetermined process to the component assembly, and then, to carry the component assembly.

8. The production apparatus according to claim 1, wherein:
   the plurality of processing areas include a first processing area, a second processing area, a third processing area, a fourth processing area, a fifth processing area, and a sixth processing area sequentially arranged in the circumferential direction of the rotational table main body;
   the plurality of processing tables include a first processing table, a second processing table, a third processing table, a fourth processing table, and a fifth processing table;
   the first processing area includes the first processing table for having the object set thereon;
   the second processing area includes the second processing table for holding the object having been transferred to the second processing table from one of the plurality of holding and transferring units, and a pre-inspection unit for performing a pre-inspection of the object held on the second processing table;
   the third processing area includes the third processing table for holding the object having been transferred to the third processing table from one of the plurality of holding and transferring units, after the pre-inspection, and a press-fit unit for performing a press-fit process to the object held on the third processing table;
   the fourth processing area includes a transfer unit for separating the jig from the object held on one of the plurality of holding and transferring units, after the press-fit process, and for transferring the jig to one of the plurality of loading portions;
   the fifth processing area includes the fourth processing table for holding the component assembly having been transferred to the fourth processing table from one of the plurality of holding and transferring units after the press-fit process, and a caulking unit for performing a caulking process to the component assembly held on the fourth processing table;

the sixth processing area includes the fifth processing table for holding the component assembly having been transferred to the fifth processing table from one of the plurality of holding and transferring units after the caulking process, a determination unit for performing a determination process on acceptance or rejection of the component assembly held on the fifth processing table, and a carrying-out unit for sorting and carrying the component assembly for which the determination process has been finished to a location where the component assembly is off of the fifth processing table; and each of the second processing table, the third processing table, and the fourth processing table is formed so as to be movable in a horizontal direction and rotatable around a vertical axis.

9. The production apparatus according to claim 8, wherein the determination unit performs the predetermined determination process while the carrying-out unit grasps and lifts up the component assembly from the fifth processing table.

10. The production apparatus according to claim 8, further comprising an accepted product transport line and a rejected product transport line for separating and transporting the component assembly determined as being accepted by the determination unit and the component assembly determined rejected by the determination unit, respectively, wherein the carrying-out unit is formed so as to carry the component assembly held thereby to a position above the accepted product transport line or a position above the rejected product transport line only by linear horizontal movement.

11. The production apparatus according to claim 10, wherein:

the carrying-out unit includes:
an arm capable of holding and releasing the component assembly,
an elevation driving mechanism for elevating the arm,
a guide rail for guiding the arm in a horizontal direction, and
a horizontal driving mechanism for moving the arm along the guide rail; and wherein the guide rail is arranged so that the component assembly can be transferred to a position above the accepted product transport line and to a position above the rejected product transport line by linear horizontal movement of the arm along the guide rail.

12. The production apparatus according to claim 8, further comprising a cover case for covering the plurality of processing areas excluding the first processing area, wherein the cover case is provided with an opening and closing door for allowing movement of the holding and transferring units-and the plurality of loading portions upon rotation of the rotational table main body.

\* \* \* \* \*